US012393533B2

United States Patent
Salvadore et al.

(10) Patent No.: US 12,393,533 B2
(45) Date of Patent: Aug. 19, 2025

(54) HOST MULTI-PATH LAYER WITH CONGESTION MITIGATION THROUGH INTERACTION WITH CENTRALIZED DISCOVERY CONTROLLER

(71) Applicant: Dell Products L.P., Round Rock, TX (US)

(72) Inventors: James R. Salvadore, Amherst, NH (US); Claire O'Keeffe, Wokingham (GB); Erik P. Smith, Douglas, MA (US); Arieh Don, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 82 days.

(21) Appl. No.: 18/499,333

(22) Filed: Nov. 1, 2023

(65) Prior Publication Data

US 2025/0139028 A1    May 1, 2025

(51) Int. Cl.
*G06F 13/16* (2006.01)
*G06F 15/173* (2006.01)

(52) U.S. Cl.
CPC .... *G06F 13/1689* (2013.01); *G06F 15/17312* (2013.01)

(58) Field of Classification Search
CPC ............ G06F 13/1689; G06F 15/17312
See application file for complete search history.

(56) References Cited

U.S. PATENT DOCUMENTS

| 7,734,808 B1 * | 6/2010 | Bergamasco ........... H04L 47/18 370/429 |
| 10,310,760 B1 | 6/2019 | Dreier et al. |
| 10,708,200 B2 * | 7/2020 | Arad ................... H04L 49/9084 |
| 10,893,105 B1 | 1/2021 | Bono et al. |

(Continued)

FOREIGN PATENT DOCUMENTS

| CN | 111224884 A | * | 6/2020 | ............. H04L 45/38 |
| JP | 2011118712 A |  | 6/2011 | |

OTHER PUBLICATIONS

Translation of CN-111224884-A (Year: 2020).*
Storpool Storage, "Demystifying: What is NVMeOF?" https://storpool.com/blog/demystifying-what-is-nvmeof, Sep. 12, 2017, 4 pages.

(Continued)

*Primary Examiner* — Henry Tsai
*Assistant Examiner* — John B Roche
(74) *Attorney, Agent, or Firm* — Ryan, Mason & Lewis, LLP

(57) ABSTRACT

An apparatus in an illustrative embodiment comprises at least one processing device that includes a processor coupled to a memory. The at least one processing device is configured to implement a centralized discovery controller for coupling to a host and to a storage system accessed by the host, with the centralized discovery controller being configured to receive from the host a congestion alert, and responsive to the received congestion alert, to send to the host and to one or more targets of the storage system corresponding congestion control messages. The congestion alert is illustratively received in the centralized discovery controller from a multi-path input-output (MPIO) driver of (Continued)

the host, where the MPIO driver controls delivery of IO operations from the host to the storage system over selected paths. The congestion control messages may comprise respective Asynchronous Event Notifications (AENs) associated with respective Asynchronous Event Requests (AERs).

20 Claims, 7 Drawing Sheets

(56) References Cited

U.S. PATENT DOCUMENTS

| | | | |
|---|---|---|---|
| 11,550,511 B2 | 1/2023 | Mallick et al. | |
| 11,631,003 B2 | 4/2023 | Martin et al. | |
| 11,733,912 B2 | 8/2023 | Chen et al. | |
| 11,762,595 B1 | 9/2023 | Achkinazi et al. | |
| 2003/0149773 A1 | 8/2003 | Harbin et al. | |
| 2007/0079081 A1 | 4/2007 | Gladwin et al. | |
| 2009/0154472 A1 | 6/2009 | Chung et al. | |
| 2009/0254572 A1 | 10/2009 | Redlich et al. | |
| 2011/0138144 A1 | 6/2011 | Tamura et al. | |
| 2012/0287791 A1* | 11/2012 | Xi | H04L 47/125 370/237 |
| 2013/0055249 A1 | 2/2013 | Vaghani et al. | |
| 2013/0198312 A1 | 8/2013 | Tamir et al. | |
| 2013/0226887 A1 | 8/2013 | Braam et al. | |
| 2014/0281020 A1* | 9/2014 | Crisan | H04L 43/02 709/235 |
| 2015/0012607 A1 | 1/2015 | Cayton et al. | |
| 2017/0177216 A1 | 6/2017 | Freyensee et al. | |
| 2017/0177222 A1 | 6/2017 | Singh et al. | |
| 2018/0205635 A1 | 7/2018 | Kim et al. | |
| 2018/0239539 A1 | 8/2018 | He et al. | |
| 2019/0102093 A1 | 4/2019 | Parnell et al. | |
| 2019/0146675 A1 | 5/2019 | Subramanian et al. | |
| 2019/0377696 A1 | 12/2019 | Patel et al. | |
| 2020/0019521 A1 | 1/2020 | Solanki et al. | |
| 2020/0026606 A1 | 1/2020 | Farnum et al. | |
| 2020/0225863 A1 | 7/2020 | Veluswamy et al. | |
| 2020/0326868 A1 | 10/2020 | Yang et al. | |
| 2021/0168076 A1* | 6/2021 | Han | H04L 49/20 |
| 2021/0405915 A1 | 12/2021 | Agarwal | |
| 2021/0406678 A1 | 12/2021 | Martin et al. | |
| 2022/0374167 A1 | 11/2022 | Mallick et al. | |
| 2023/0123387 A1* | 4/2023 | Southworth | H04L 47/562 709/224 |
| 2023/0229341 A1 | 7/2023 | Chen et al. | |
| 2023/0297238 A1 | 9/2023 | Mallick et al. | |
| 2023/0325084 A1 | 10/2023 | Achkinazi et al. | |

OTHER PUBLICATIONS

VMware, "VMware ESX Server," Product Datasheet, 2007, 4 pages.
Wikipedia, "Host Adapter," https://en.wikipedia.org/wiki/Host_adapter, Jul. 19, 2021, 4 pages.
Wikipedia, "iSCSI," https://en.wikipedia.org/wiki/ISCSI, Dec. 22, 2021, 10 pages.
Wikipedia, "NVM Express," https://en.wikipedia.org/wiki/NVM_Express, Jan. 13, 2022, 18 pages.
A. S. Gillis, "NVMe Over Fabrics (NVMe-oF)," https://searchstorage.techtarget.com/definition/NVMe-over-Fabrics-Nonvolatile-Memory-Express-over-Fabrics?vgnextfmt=print, Jan. 15, 2020, 5 pages.
Wikipedia, "Remote Direct Memory Access," https://en.wikipedia.org/wiki/Remote_direct_memory_access, Jan. 30, 2021, 3 pages.
M. Hoyt, "ScaleIO Tech Overview and Concepts: SDS-SAN vs SDS-Array," https://www.thinkahead.com/TheLAB/scaleio-tech-overview-concepts-sds-san-vs-sds-array/, Apr. 5, 2017, 16 pages.
EMC Corporation, "EMC ScaleIO Architectural and Functional Overview," EMC White Paper, Dec. 2013, 13 pages.
Dell EMC, "Dell EMC VxFlex OS: Networking Best Practices and Design Considerations," Dell EMC White Paper, Jul. 2018, 38 pages.
R. Kerns, "What is Block I/O?" searchstorage.techtarget.com/answer/What-is-block-I-O, Oct. 19, 2005, 2 pages.
Janalta Interactive, "Client-Side" https://www.techopedia.com/definition/439/client-side, Accessed Jan. 14, 2022, 8 pages.
Emc Corporation, "EMC ScaleIO Design Considerations and Best Practices," EMC White Paper, Jun. 2016, 30 pages.
Mellanox Technologies, "Roce vs. iWARP Competitive Analysis," White Paper, Feb. 2017, 6 pages.
NVM Express, "NVM Express Base Specification, Revision 2.0c," NVM Express, Oct. 4, 2022, 458 pages.
Dell Technologies, "Dell PowerFlex," Spec Sheet, Aug. 2023, 14 pages.
H. Strass, "An Introduction to NVMe," https://labs.seagate.com/portfolio/an-introduction-to-nvme/, May 2016, 8 pages.
U.S. Appl. No. 17/964,560 filed in the name of Igor Achkinazi et al. on Oct. 12, 2022, and entitled "Host-Based Locality Determination Using Locality Log Pages."
U.S. Appl. No. 18/335,240 filed in the name of Igor Achkinazi et al. on Jun. 15, 2023, and entitled "Storage System with Automated Filtering of Discovery Information Utilizing Specified Configuration Domains."
U.S. Appl. No. 18/244,454 filed in the name of Sanjib Mallick et al. on Sep. 11, 2023, and entitled "Host Multi-Path Layer with Proxy Volume Redirection for Enhanced Scalability of Distributed Storage Systems."

* cited by examiner

HOST MULTI-PATH LAYER WITH CONGESTION MITIGATION THROUGH INTERACTION WITH CENTRALIZED DISCOVERY CONTROLLER

FIELD

The field relates generally to information processing systems, and more particularly to storage in information processing systems.

BACKGROUND

Information processing systems often include distributed storage systems comprising multiple storage nodes. These distributed storage systems are often dynamically reconfigurable under software control in order to adapt the number and type of storage nodes and the corresponding system storage capacity as needed, in an arrangement commonly referred to as a software-defined storage system. For example, in a typical software-defined storage system, storage capacities of multiple distributed storage nodes are pooled together into one or more storage pools. For applications running on a host that utilizes the software-defined storage system, such a storage system provides a logical storage volume view to allow a given application to store and access data, without the application being aware that the data is being dynamically distributed among different storage nodes. In these and numerous other storage system arrangements, it can be unduly difficult to mitigate network congestion, particularly when using advanced storage access protocols such as Non-Volatile Memory Express (NVMe) over Fabrics, also referred to as NVMe-OF, or NVMe over Transmission Control Protocol (TCP), also referred to as NVMe/TCP. For example, conventional approaches such as Explicit Congestion Notification (ECN) mechanisms can help to regulate the flow of data and thereby limit network congestion, but these mechanisms exhibit significant drawbacks, such as compatibility issues and increased complexity in their implementation.

SUMMARY

Illustrative embodiments provide techniques for congestion mitigation in a multi-path layer of one or more hosts through interaction with a centralized discovery controller. The centralized discovery controller in some embodiments is implemented, for example, in a switch fabric of a network through which the one or more hosts communicate with a distributed storage system or other type of storage system.

Such techniques advantageously facilitate the usage of advanced storage access protocols such as NVMe-oF or NVMe/TCP while avoiding the above-described drawbacks of conventional practice. For example, some embodiments can substantially eliminate or otherwise alleviate one or more of the above-noted drawbacks of ECN mechanisms, thereby providing significantly enhanced congestion mitigation.

Although some embodiments are described herein in the context of implementing an NVMe-oF or NVMe/TCP access protocol in a software-defined storage system or other distributed storage system, it is to be appreciated that other embodiments can be implemented in other types of storage systems using other storage access protocols.

In one embodiment, an apparatus comprises at least one processing device that includes a processor coupled to a memory. The at least one processing device is configured to implement a centralized discovery controller for coupling to a host and to a storage system accessed by the host, with the centralized discovery controller being configured to receive from the host a congestion alert, and responsive to the received congestion alert, to send to the host and to one or more targets of the storage system corresponding congestion control messages.

The congestion alert is illustratively received in the centralized discovery controller from a multi-path input-output (MPIO) driver of the host, where the MPIO driver controls delivery of IO operations from the host to the storage system over selected paths.

The congestion control messages may comprise respective Asynchronous Event Notifications (AENs) associated with respective Asynchronous Event Requests (AERs) previously sent by the host and the one or more targets of the storage system to the centralized discovery controller.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
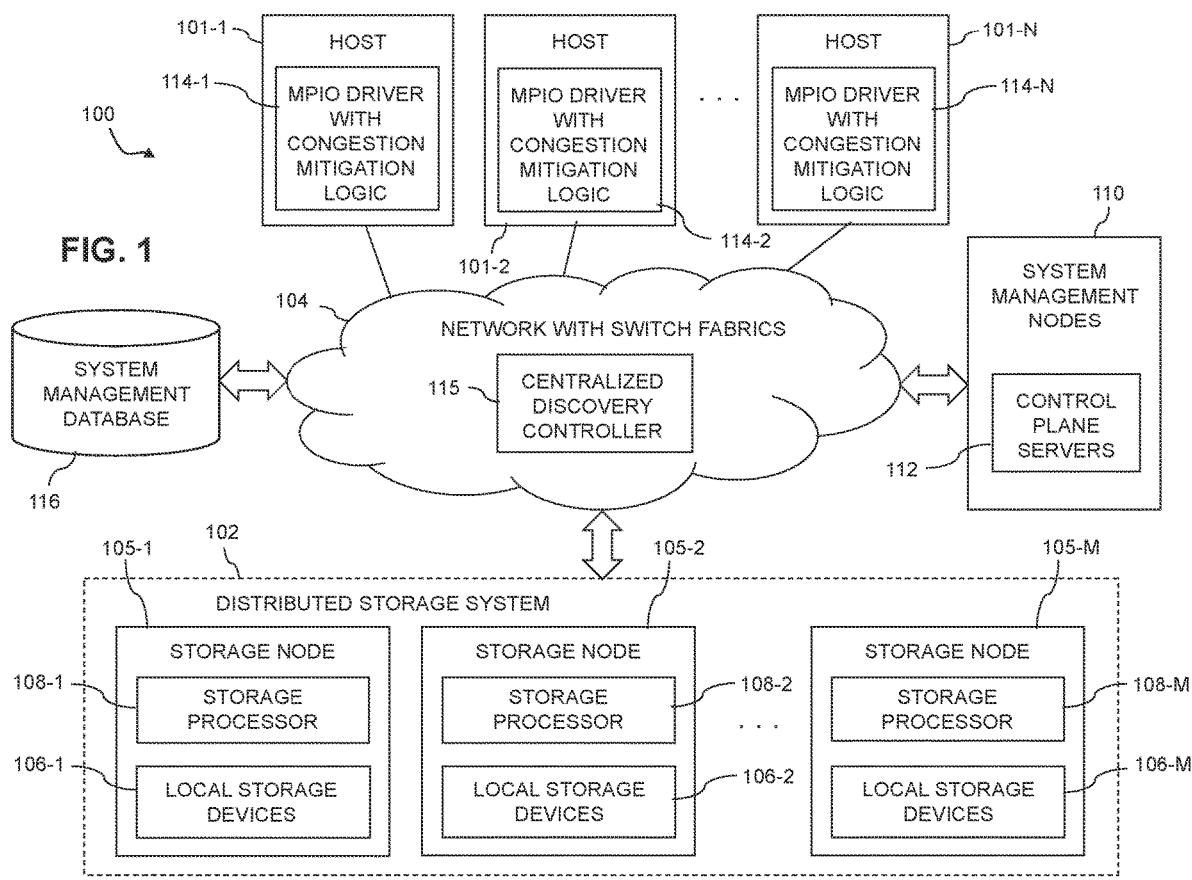
FIG. 1 is a block diagram of an information processing system incorporating functionality for congestion mitigation in an illustrative embodiment.

FIG. 1 shows an information processing system 100 configured in accordance with an illustrative embodiment.

The information processing system 100 comprises a plurality of hosts 101-1, 101-2, . . . 101-N, collectively referred to herein as hosts 101, and a distributed storage system 102 shared by the hosts 101. The hosts 101 and distributed storage system 102 in this embodiment are configured to communicate with one another via a network 104 that illustratively utilizes protocols such as Transmission Control Protocol (TCP) and Internet Protocol (IP), and is therefore referred to herein as a TCP/IP network, although it is to be appreciated that the network 104 can operate using additional or alternative protocols. In some embodiments, the network 104 comprises a storage area network (SAN) that includes one or more Fibre Channel (FC) switches, Ethernet switches or other types of switch fabrics.

It should be noted that the term "host" as used herein is intended to be broadly construed, so as to encompass, for example, a host device or a host system, each of which may comprise multiple distinct devices of various types. A host in some embodiments can comprise, for example, at least one server, as well as additional or alternative types and arrangements of processing devices.

The distributed storage system 102 more particularly comprises a plurality of storage nodes 105-1, 105-2, . . . 105-M, collectively referred to herein as storage nodes 105. The values N and M in this embodiment denote arbitrary integer values that in the figure are illustrated as being greater than or equal to three, although other values such as N=1, N=2, M=1 or M=2 can be used in other embodiments.

The storage nodes 105 collectively form the distributed storage system 102, which is just one possible example of what is generally referred to herein as a "distributed storage system." Other distributed storage systems can include different numbers and arrangements of storage nodes, and possibly one or more additional components. For example, as indicated above, a distributed storage system in some embodiments may include only first and second storage nodes, corresponding to an M=2 embodiment. Some embodiments can configure a distributed storage system to include additional components in the form of a system manager implemented using one or more additional nodes.

In some embodiments, the distributed storage system 102 provides a logical address space that is divided among the storage nodes 105, such that different ones of the storage nodes 105 store the data for respective different portions of the logical address space. Accordingly, in these and other similar distributed storage system arrangements, different ones of the storage nodes 105 have responsibility for different portions of the logical address space. For a given logical storage volume, logical blocks of that logical storage volume are illustratively distributed across the storage nodes 105.

Other types of distributed storage systems can be used in other embodiments. For example, distributed storage system 102 can comprise multiple distinct storage arrays, such as a production storage array and a backup storage array, possibly deployed at different locations. Accordingly, in some embodiments, one or more of the storage nodes 105 may each be viewed as comprising at least a portion of a separate storage array with its own logical identifier (e.g., address) space. Alternatively, the storage nodes 105 can be viewed as collectively comprising one or more storage arrays. The term "storage node" as used herein is therefore intended to be broadly construed.

In some embodiments, the distributed storage system 102 comprises a software-defined storage system and the storage nodes 105 comprise respective software-defined storage server nodes of the software-defined storage system, such nodes also being referred to herein as SDS server nodes, where SDS denotes software-defined storage. Accordingly, the number and types of storage nodes 105 can be dynamically expanded or contracted under software control in some embodiments. Examples of such software-defined storage systems will be described in more detail below in conjunction with FIG. 5.

It is to be appreciated, however, that techniques disclosed herein can be implemented in other embodiments in stand-alone storage arrays or other types of storage systems that are not distributed across multiple storage nodes. The disclosed techniques are therefore applicable to a wide variety of different types of storage systems. The distributed storage system 102 is just one illustrative example.

In the distributed storage system 102, each of the storage nodes 105 is illustratively configured to interact with one or more of the hosts 101. The hosts 101 illustratively comprise servers or other types of computers of an enterprise computer system, cloud-based computer system or other arrangement of multiple compute nodes, each associated with one or more system users.

The hosts 101 in some embodiments illustratively provide compute services such as execution of one or more applications on behalf of each of one or more users associated with respective ones of the hosts 101. Such applications illustratively generate input-output (IO) operations that are processed by a corresponding one of the storage nodes 105. The term "input-output" as used herein refers to at least one of input and output. For example, IO operations may comprise write requests and/or read requests directed to logical addresses of a particular logical storage volume of one or more of the storage nodes 105. These and other types of IO operations are also generally referred to herein as IO requests.

The IO operations that are currently being processed in the distributed storage system 102 in some embodiments are referred to herein as outstanding IOs that have been admitted by the storage nodes 105 to further processing within the system 100. The storage nodes 105 are illustratively configured to queue IO operations arriving from one or more of the hosts 101 in one or more sets of IO queues.

The storage nodes 105 illustratively comprise respective processing devices of one or more processing platforms. For example, the storage nodes 105 can each comprise one or more processing devices each having a processor and a memory, possibly implementing virtual machines and/or containers, although numerous other configurations are possible.

The storage nodes 105 can additionally or alternatively be part of cloud infrastructure, such as a cloud-based system implementing Storage-as-a-Service (STaaS) functionality.

The storage nodes 105 may be implemented on a common processing platform, or on separate processing platforms. In the case of separate processing platforms, there may be a single storage node per processing platform or multiple storage nodes per processing platform.

The hosts 101 are illustratively configured to write data to and read data from the distributed storage system 102 comprising storage nodes 105 in accordance with applications executing on those hosts 101 for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise. Combinations of cloud and edge infrastructure can also be used in implementing a given information processing system to provide services to users.

Communications between the components of system 100 can take place over additional or alternative networks, including a global computer network such as the Internet, a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The system 100 in some embodiments therefore comprises one or more additional networks other than network 104 each comprising processing devices configured to communicate using TCP, IP and/or other communication protocols.

As a more particular example, some embodiments may utilize one or more high-speed local networks in which associated processing devices communicate with one another utilizing Peripheral Component Interconnect express (PCIe) interface cards and/or other types of interfaces of those devices, including, again by way of example, LAN On Motherboard (LOM) network interface cards (NICs) or other types of NICs. Such devices, together with associated host software such as, for example, IO drivers, networking stacks and/or other components, illustratively support networking protocols such as InfiniBand or Fibre Channel, in addition to or in place of TCP/IP. Numerous alternative networking arrangements are possible in a given embodiment, as will be appreciated by those skilled in the art. Additional examples include remote direct memory access (RDMA) over Converged Ethernet (RoCE), illustratively RoCEv2, or RDMA over iWARP.

The first storage node 105-1 comprises a plurality of storage devices 106-1 and an associated storage processor 108-1. The storage devices 106-1 illustratively store metadata and user data associated with one or more storage volumes of the distributed storage system 102. The storage volumes illustratively comprise respective logical units (LUNs) or other types of logical storage volumes (e.g., NVMe namespaces). The storage devices 106-1 more particularly comprise local persistent storage devices of the first storage node 105-1. Such persistent storage devices are local to the first storage node 105-1, but remote from the second storage node 105-2, the storage node 105-M and any other ones of other storage nodes 105.

Each of the other storage nodes 105-2 through 105-M is assumed to be configured in a manner similar to that described above for the first storage node 105-1. Accordingly, by way of example, storage node 105-2 comprises a plurality of storage devices 106-2 and an associated storage processor 108-2, and storage node 105-M comprises a plurality of storage devices 106-M and an associated storage processor 108-M.

As indicated previously, the storage devices 106-2 through 106-M illustratively store metadata and user data associated with one or more storage volumes of the distributed storage system 102, such as the above-noted LUNs, NVMe namespaces or other types of logical storage volumes. The storage devices 106-2 more particularly comprise local persistent storage devices of the storage node 105-2. Such persistent storage devices are local to the storage node 105-2, but remote from the first storage node 105-1, the storage node 105-M, and any other ones of the storage nodes 105. Similarly, the storage devices 106-M more particularly comprise local persistent storage devices of the storage node 105-M. Such persistent storage devices are local to the storage node 105-M, but remote from the first storage node 105-1, the second storage node 105-2, and any other ones of the storage nodes 105.

The local persistent storage of a given one of the storage nodes 105 illustratively comprises the particular local persistent storage devices that are implemented in or otherwise associated with that storage node.

The storage processors 108 of the storage nodes 105 may include additional modules and other components typically found in conventional implementations of storage processors and storage systems, although such additional modules and other components are omitted from the figure for clarity and simplicity of illustration.

Additionally or alternatively, the storage processors 108 in some embodiments can comprise or be otherwise associated with one or more write caches and one or more write cache journals, both also illustratively distributed across the storage nodes 105 of the distributed storage system. It is further assumed in illustrative embodiments that one or more additional journals are provided in the distributed storage system, such as, for example, a metadata update journal and possibly other journals providing other types of journaling functionality for IO operations. Illustrative embodiments disclosed herein are assumed to be configured to perform various destaging processes for write caches and associated journals, and to perform additional or alternative functions in conjunction with processing of IO operations.

The storage devices 106 of the storage nodes 105 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM), magnetic RAM (MRAM), resistive RAM, and spin torque transfer magneto-resistive RAM (STT-MRAM), among numerous other NVM device types known to those skilled in the art. These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices. Such storage devices are examples of local persistent storage devices of the storage nodes 105 of the distributed storage system of FIG. 1.

In some embodiments, the storage nodes 105 collectively provide a distributed storage system, although the storage nodes 105 can be used to implement other types of storage systems in other embodiments. One or more such storage nodes can be associated with at least one storage array. Additional or alternative types of storage products that can be used in implementing a given storage system in illustrative embodiments include software-defined storage, cloud storage and object-based storage. Combinations of multiple ones of these and other storage types can also be used.

As indicated above, the storage nodes 105 in some embodiments comprise respective software-defined storage server nodes of a software-defined storage system, in which the number and types of storage nodes 105 can be dynamically expanded or contracted under software control using software-defined storage techniques.

The term "storage system" as used herein is therefore intended to be broadly construed, and should not be viewed as being limited to certain types of storage systems, such as content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

In some embodiments, communications between the hosts 101 and the storage nodes 105 comprise NVMe commands of an NVMe storage access protocol, for example, as described in the NVM Express Base Specification, Revision 2.0c, October 2022, and its associated NVM Express Command Set Specification and NVM Express TCP Transport Specification, all of which are incorporated by reference herein. Other examples of NVMe storage access protocols that may be utilized in illustrative embodiments disclosed herein include NVMe over Fabrics, also referred to herein as NVMe-oF, and NVMe over TCP, also referred to herein as NVMe/TCP. Other embodiments can utilize other types of storage access protocols. As another example, communications between the hosts 101 and the storage nodes 105 in some embodiments can comprise Small Computer System Interface (SCSI) commands and the Internet SCSI (iSCSI) protocol.

Other types of commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other types, formats and configurations of IO operations can be used in other embodiments, as that term is broadly used herein.

Some embodiments disclosed herein are configured to utilize one or more RAID arrangements to store data across the storage devices 106 in each of one or more of the storage nodes 105 of the distributed storage system 102. Other embodiments can utilize other data protection techniques, such as, for example, Erasure Coding (EC), instead of one or more RAID arrangements.

The RAID arrangement can comprise, for example, a RAID 5 arrangement supporting recovery from a failure of a single one of the plurality of storage devices, a RAID 6 arrangement supporting recovery from simultaneous failure of up to two of the storage devices, or another type of RAID arrangement. For example, some embodiments can utilize RAID arrangements with redundancy higher than two.

The term "RAID arrangement" as used herein is intended to be broadly construed, and should not be viewed as limited to RAID 5, RAID 6 or other parity RAID arrangements. For example, a RAID arrangement in some embodiments can comprise combinations of multiple instances of distinct RAID approaches, such as a mixture of multiple distinct RAID types (e.g., RAID 1 and RAID 6) over the same set of storage devices, or a mixture of multiple stripe sets of different instances of one RAID type (e.g., two separate instances of RAID 5) over the same set of storage devices. Other types of parity RAID techniques and/or non-parity RAID techniques can be used in other embodiments.

Such a RAID arrangement is illustratively established by the storage processors 108 of the respective storage nodes 105. The storage devices 106 in the context of RAID arrangements herein are also referred to as "disks" or "drives." A given such RAID arrangement may also be referred to in some embodiments herein as a "RAID array."

The RAID arrangement used in an illustrative embodiment includes a plurality of devices, each illustratively a different physical storage device of the storage devices 106. Multiple such physical storage devices are typically utilized to store data of a given LUN, NVMe namespace or other logical storage volume in the distributed storage system. For example, data pages or other data blocks of a given LUN, NVMe namespace or other logical storage volume can be "striped" along with its corresponding parity information across multiple ones of the devices in the RAID arrangement in accordance with RAID 5 or RAID 6 techniques.

A given RAID 5 arrangement defines block-level striping with single distributed parity and provides fault tolerance of a single drive failure, so that the array continues to operate with a single failed drive, irrespective of which drive fails. For example, in a conventional RAID 5 arrangement, each stripe includes multiple data blocks as well as a corresponding p parity block. The p parity blocks are associated with respective row parity information computed using well-known RAID 5 techniques. The data and parity blocks are distributed over the devices to support the above-noted single distributed parity and its associated fault tolerance.

A given RAID 6 arrangement defines block-level striping with double distributed parity and provides fault tolerance of up to two drive failures, so that the array continues to operate with up to two failed drives, irrespective of which two drives fail. For example, in a conventional RAID 6 arrangement, each stripe includes multiple data blocks as well as corresponding p and q parity blocks. The p and q parity blocks are associated with respective row parity information and diagonal parity information computed using well-known RAID 6 techniques. The data and parity blocks are distributed over the devices to collectively provide a diagonal-based configuration for the p and q parity information, so as to support the above-noted double distributed parity and its associated fault tolerance.

In such RAID arrangements, the parity blocks are typically not read unless needed for a rebuild process triggered by one or more storage device failures.

These and other references herein to RAID 5, RAID 6 and other particular RAID arrangements are only examples, and numerous other RAID arrangements can be used in other embodiments. Also, other embodiments can store data across the storage devices 106 of the storage nodes 105 without using RAID arrangements.

In some embodiments, the storage nodes 105 of the distributed storage system of FIG. 1 are illustratively interconnected with one another in a full mesh network, or other topology providing full any-to-any network connectivity, and are collectively managed by a system manager. A given set of local persistent storage devices on a given one of the storage nodes 105 is illustratively implemented in a disk array enclosure (DAE) or other type of storage array enclosure of that storage node. Each of the storage nodes 105 illustratively comprises a CPU or other type of processor, a memory, a network interface card (NIC) or other type of network interface, and its corresponding storage devices 106, possibly arranged as part of a DAE of the storage node.

In some embodiments, different ones of the storage nodes 105 are associated with the same DAE or other type of storage array enclosure. The system manager is illustratively implemented as a management module or other similar management logic instance, possibly running on one or more of the storage nodes 105, on another storage node and/or on a separate non-storage node of the distributed storage system.

As a more particular non-limiting illustration, the storage nodes 105 in some embodiments are paired together in an arrangement referred to as a "brick," with each such brick being coupled to a different DAE comprising multiple drives, and each node in a brick being connected to the DAE and to each drive through a separate connection. The system manager may be running on one of the two nodes of a first one of the bricks of the distributed storage system. Again, numerous other arrangements of the storage nodes are possible in a given distributed storage system as disclosed herein.

The system 100 as shown further comprises a plurality of system management nodes 110 that are illustratively configured to provide system management functionality of the type noted above. Such functionality in the present embodiment illustratively further involves utilization of control plane servers 112 and a system management database 116. In some embodiments, at least portions of the system management nodes 110 and their associated control plane servers 112 are distributed over the storage nodes 105. For example, a designated subset of the storage nodes 105 can each be configured to include a corresponding one of the control plane servers 112. Other system management functionality provided by system management nodes 110 can be similarly distributed over a subset of the storage nodes 105.

The system management database 116 stores configuration and operation information of the system 100 and portions thereof are illustratively accessible to various system administrators such as host administrators and storage administrators.

The hosts 101-1, 101-2, . . . 101-N include respective MPIO drivers 114-1, 114-2, . . . 114-N, each of which is assumed to comprise congestion mitigation logic as well as path selection logic. The MPIO drivers 114 are illustratively utilized in supporting functionality for congestion mitigation, as described in more detail below.

In some embodiments, each of the storage nodes 105 of the distributed storage system 102 is assumed to comprise multiple controllers associated with a corresponding target of that storage node. Such a "target" as that term is broadly used herein is illustratively a destination end of one or more paths from one or more of the hosts 101 to the storage node, and may comprise, for example, an NVM subsystem of the storage node, although other types of targets can be used in other embodiments. It should be noted that different types of targets may be present in NVMe embodiments than are present in other embodiments that use other storage access protocols, such as SCSI embodiments. Accordingly, the types of targets that may be implemented in a given embodiment can vary depending upon the particular storage access protocol being utilized in that embodiment, and/or other factors. Similarly, the types of initiators can vary depending upon the particular storage access protocol, and/or other factors. Again, terms such as "initiator" and "target" as used herein are intended to be broadly construed, and should not be viewed as being limited in any way to particular types of components associated with any particular storage access protocol.

The paths that are selected by instances of path selection logic in the MPIO drivers 114 of the respective hosts 101 for delivering IO operations from the hosts 101 to the distributed storage system 102 are associated with respective initiator-target pairs, as described in more detail elsewhere herein.

In some embodiments, IO operations are processed in the hosts 101 utilizing their respective MPIO drivers 114 in the following manner. A given one of the hosts 101 establishes a plurality of paths between at least one initiator of the given host and a plurality of targets of respective storage nodes 105 of the distributed storage system 102. For each of a plurality of IO operations generated in the given host for delivery to the distributed storage system 102, the host selects a path to a particular target, and sends the IO operation to the corresponding storage node over the selected path.

The given host above is an example of what is more generally referred to herein as "at least one processing device" that includes a processor coupled to a memory. The storage nodes 105 of the distributed storage system 102 are also examples of "at least one processing device" as that term is broadly used herein.

It is to be appreciated that path selection as disclosed herein can be performed independently by each of the hosts 101, illustratively utilizing their respective MPIO drivers 114 and their corresponding congestion mitigation logic and path selection logic, as indicated above, with possible involvement of additional or alternative system components.

In some embodiments, the initiator of the given host and the targets of the respective storage nodes 105 are configured to support one or more designated standard storage access protocols, such as an NVMe access protocol or a SCSI access protocol. As more particular examples in the NVMe context, the designated storage access protocol may comprise an NVMe/FC or NVMe/TCP access protocol, although a wide variety of additional or alternative storage access protocols can be used in other embodiments.

The hosts 101 can comprise additional or alternative components. For example, in some embodiments, the hosts 101 further comprise respective sets of IO queues associated with respective ones of the MPIO drivers 114. The MPIO drivers 114 collectively comprise a multi-path layer of the hosts 101. Path selection functionality for delivery of IO operations from the hosts 101 to the distributed storage system 102 is provided in the multi-path layer by respective instances of congestion mitigation logic and path selection logic implemented within the corresponding MPIO drivers 114.

The MPIO drivers 114 may comprise, for example, otherwise conventional MPIO drivers, such as PowerPath® drivers from Dell Technologies, suitably modified in the manner disclosed herein to include respective instances of congestion mitigation logic and to provide one or more portions of the disclosed functionality for congestion mitigation.

Other types of MPIO drivers may be suitably modified to incorporate one or more portions of the functionality for congestion mitigation as disclosed herein. These include MPIO drivers implemented using alternative types of multipathing software such as, for example, Microsoft Multipath I/O, VMware native multipathing (NMP), and Linux Device Mapper Multipath (DM-Multipath), each illustratively providing instances of MPIO drivers as that term is broadly used herein.

In some embodiments, the hosts 101 comprise respective local caches, implemented using respective memories of those hosts. A given such local cache can be implemented using one or more cache cards. A wide variety of different caching techniques can be used in other embodiments, as will be appreciated by those skilled in the art. Other examples of memories of the respective hosts 101 that may be utilized to provide local caches include one or more memory cards or other memory devices, such as, for example, an NVMe over PCIe cache card, a local flash drive or other type of NVM storage drive, or combinations of these and other host memory devices.

The MPIO drivers 114 are illustratively configured to deliver IO operations selected from their respective sets of IO queues to the distributed storage system 102 via selected ones of multiple paths over the network 104. The sources of the IO operations stored in the sets of IO queues illustratively include respective processes of one or more applications executing on the hosts 101. For example, IO operations can be generated by each of multiple processes of a database application running on one or more of the hosts 101. Such processes issue IO operations for delivery to the distributed storage system 102 over the network 104. Other types of sources of IO operations may be present in a given implementation of system 100.

A given IO operation is therefore illustratively generated by a process of an application running on a given one of the hosts 101, and is queued in one of the IO queues of the given host with other operations generated by other processes of that application, and possibly other processes of other applications.

The paths from the given host to the distributed storage system 102 illustratively comprise paths associated with respective initiator-target pairs, with each initiator comprising, for example, a port of a single-port or multi-port host bus adaptor (HBA) or other initiating entity of the given host and each target comprising a port or other targeted entity corresponding to one or more of the storage devices 106 of the distributed storage system 102. As noted above, the storage devices 106 illustratively comprise LUNs, NVMe namespaces or other types of logical storage devices.

In some embodiments, the paths are associated with respective communication links between the given host and the distributed storage system 102 with each such communication link having a negotiated link speed. For example, in conjunction with registration of a given HBA to a switch of the network 104, the HBA and the switch may negotiate a link speed. The actual link speed that can be achieved in practice in some cases is less than the negotiated link speed, which is a theoretical maximum value.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

Accordingly, in some embodiments, multiple virtual initiators are associated with a single HBA of a given one of the hosts 101 but have respective unique identifiers associated therewith.

Additionally or alternatively, different ones of the multiple virtual initiators are illustratively associated with respective different ones of a plurality of virtual machines of the given host that share a single HBA of the given host, or a plurality of logical partitions of the given host that share a single HBA of the given host.

Numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various scheduling algorithms, load balancing algorithms and/or other types of algorithms can be utilized by the MPIO driver of the given host in delivering IO operations from the IO queues of that host to the distributed storage system 102 over particular paths via the network 104. Each such IO operation is assumed to comprise one or more commands for instructing the distributed storage system 102 to perform particular types of storage-related functions such as reading data from or writing data to particular logical volumes of the distributed storage system 102. For example, in the case of write requests, such commands are assumed to have various payload sizes associated therewith, and the payload associated with a given command may be referred to as its "command payload." Other arrangements are used for read requests, with the payload moving in the opposite direction.

A command directed by the given host to the distributed storage system 102 is considered an "outstanding" command until such time as its execution is completed in the viewpoint of the given host, at which time it is considered a "completed" command. The commands illustratively comprise respective NVMe commands, although other command formats, such as SCSI command formats, can be used in other embodiments. In the SCSI context, a given such command is illustratively defined by a corresponding command descriptor block (CDB) or similar format construct. The given command can have multiple blocks of payload associated therewith, such as a particular number of 512-byte SCSI logical blocks or other sizes and/or structures of logical blocks. Other command formats, e.g., Submission Queue Entry (SQE), are utilized in the NVMe context.

In illustrative embodiments to be described below, it is assumed without limitation that the initiators of a plurality of initiator-target pairs comprise or are otherwise associated with respective ports of the given host and that the targets of the plurality of initiator-target pairs comprise or are otherwise associated respective ports of the distributed storage system 102, although numerous other initiator-target arrangements are possible, and such terms are therefore intended to be broadly construed herein, and should not be viewed as limited to particular interface types, such as SCSI or NVMe interfaces. Non-limiting examples of host ports and storage array ports are illustrated in conjunction with the embodiment of FIG. 5. The host ports can comprise, for example, ports of single-port HBAs and/or ports of multi-port HBAs, or other types of host ports, including NICs. Again, a wide variety of other types and arrangements of initiators and targets can be used in other embodiments.

Selecting a particular one of multiple available paths for delivery of a selected one of the IO operations from the given host is more generally referred to herein as "path selection." Path selection as that term is broadly used herein can in some cases involve both selection of a particular IO operation and selection of one of multiple possible paths for accessing a corresponding logical device of the distributed storage system 102. The corresponding logical device illustratively comprises a LUN or other logical storage volume (e.g., an NVMe namespace) to which the particular IO operation is directed.

It should be noted that paths may be added or deleted between the hosts 101 and the distributed storage system 102 in the system 100. For example, the addition of one or more new paths from the given host to the distributed storage system 102 or the deletion of one or more existing paths from the given host to the distributed storage system 102 may result from respective addition or deletion of at least a portion of the storage devices 106 of the distributed storage system 102.

Addition or deletion of paths can also occur as a result of zoning and masking changes or other types of storage system reconfigurations performed by a storage administrator or other user. Some embodiments are configured to send a predetermined command from the given host to the distributed storage system 102, illustratively utilizing the MPIO driver, to determine if zoning and masking information has been changed. The predetermined command can comprise, for example, in the SCSI context, a log sense command, a mode sense command, a "vendor unique command" or VU command, or combinations of multiple instances of these or other commands, in an otherwise standardized command format. Analogous NVMe commands include Get Log Page and Get Features commands.

In some embodiments, paths are added or deleted in conjunction with, for example, load rebalancing among storage nodes, or under other conditions such as addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths. Such path discovery is illustratively implemented at least in part through interaction with a centralized discovery controller or CDC.

Additionally or alternatively, a given path discovery scan can be performed utilizing known functionality of conventional MPIO drivers, such as PowerPath® drivers.

The path discovery scan in some embodiments may be further configured to identify one or more new LUNs, NVMe namespaces or other logical storage volumes associated with the one or more new paths identified in the path discovery scan. The path discovery scan may comprise, for example, one or more scans that are configured to discover the appearance of any new LUNs or NVMe namespaces that have been added to the distributed storage system 102 as well to discover the disappearance of any existing LUNs or NVMe namespaces that have been deleted from the distributed storage system 102.

The MPIO driver of the given host in some embodiments comprises a user-space portion and a kernel-space portion. The kernel-space portion of the MPIO driver may be configured to detect one or more path changes of the type mentioned above, and to instruct the user-space portion of the MPIO driver to run a path discovery scan responsive to the detected path changes. Other divisions of functionality between the user-space portion and the kernel-space portion of the MPIO driver are possible. The user-space portion of the MPIO driver is illustratively associated with an operating system kernel of the given host.

For each of one or more new paths identified in the path discovery scan, the given host may be configured to execute a host registration operation for that path. The host registration operation for a given new path illustratively provides notification to the distributed storage system 102 that the given host has discovered the new path.

As indicated previously, the storage nodes 105 of the distributed storage system 102 process IO operations from one or more hosts 101 and in processing those IO operations run various storage application processes that generally involve interaction of that storage node with one or more other ones of the storage nodes.

In the FIG. 1 embodiment, the distributed storage system 102 comprises storage processors 108 and corresponding sets of storage devices 106, and may include additional or alternative components, such as sets of local caches.

The storage processors 108 illustratively control the processing of IO operations received in the distributed storage system 102 from the hosts 101. For example, the storage processors 108 illustratively manage the processing of read and write commands directed by the MPIO drivers of the hosts 101 to particular ones of the storage nodes 105. This processing illustratively includes, for example, a given one of the storage processors 108 on a given one of the storage nodes 105 directing read requests and/or write requests received from one or more of the hosts 101 to local storage devices on the given storage node and/or local storage devices on one or more other ones of the storage nodes 105.

The storage processors 108 can be implemented as respective storage controllers, directors or other storage system components configured to control storage system operations relating to processing of IO operations. In some embodiments, each of the storage processors 108 has a different one of the above-noted local caches associated therewith, although numerous alternative arrangements are possible.

The manner in which functionality for congestion mitigation is implemented in system 100 will now be described in more detail.

As indicated previously, in many distributed storage systems, including software-defined storage system arrangements utilizing advanced storage access protocols such as NVMe-oF or NVMe/TCP, network congestion can present a significant problem.

For example, when utilizing NVMe/TCP, network congestion between the hosts 101 and the distributed storage system 102 can have a significant impact on system performance and stability. NVMe/TCP typically requires a reliable, low-latency network, and when the network is congested the available bandwidth for data transmission is reduced, which leads to delays in data transmission and increased IO latency. Network congestion may also cause packet loss, which may lead to data loss/corruption and reduce the reliability of the communications between the hosts 101 and the distributed storage system 102.

Conventional approaches such as Explicit Congestion Notification (ECN) mechanisms can help to regulate the flow of data and thereby limit network congestion, but these mechanisms exhibit significant drawbacks, such as compatibility issues and increased complexity in their implementation.

Illustrative embodiments disclosed herein address and overcome these and other issues of conventional practice by providing techniques for congestion mitigation in a multi-path layer of hosts 101 and/or in distributed storage system 102 through interaction with centralized discovery controller 115. Such a centralized discovery controller is sometimes referred to elsewhere herein as a CDC. The centralized discovery controller 115 in some embodiments is implemented, for example, in a switch fabric of network 104 through which the hosts 101 communicate with distributed storage system 102.

Such techniques advantageously facilitate the usage of advanced storage access protocols such as NVMe-oF or NVMe/TCP while avoiding the above-described drawbacks of conventional practice. For example, some embodiments can substantially eliminate or otherwise alleviate one or more of the above-noted drawbacks of ECN mechanisms, thereby providing significantly enhanced congestion mitigation.

In some embodiments, the centralized discovery controller 115 is implemented at least in part as a network device or software component that is responsible for discovering NVMe-oF endpoints (e.g., hosts and subsystems) and then managing access control in a centralized manner using Discovery Log Pages. It is typically used in large enterprise networks, data centers, or cloud environments where there are many network devices and endpoints that need to be managed. The centralized discovery controller 115 in some embodiments maintains a real-time map of NVMe Qualified Names (NON), Internet Protocol (IP) Addresses, device type, and/or other relevant information for each of the endpoints.

Such an arrangement is advantageous in that it simplifies the management and troubleshooting of the system 100 by providing a centralized view of the network topology and device locations. It also enables network automation and orchestration by providing a single point of control for network devices. Additionally, it can improve network security by identifying unauthorized devices on the network and enforcing network access policies using zoning. Zoning illustratively includes the partitioning of a network fabric into smaller subsets to restrict interference, add security, and to simplify management. Zoning may be viewed as a way of grouping devices in a SAN based on their physical or logical connections so that boundaries are created which isolate traffic and prevent unauthorized access.

Direct discovery for NVMe/TCP-based SANs illustratively provides manual configuration of a host to a specific target subsystem. This process can be acceptable in smaller fabrics with a few dozen host and storage endpoints. However, manual configuration and discovery of each storage subsystem on a host can quickly become difficult and error prone for administrators as fabrics scale.

The centralized discovery controller 115 in some embodiments provides a discovery mechanism that a host can use to "automatically" determine which storage subsystems on the fabric the host can access. For example, the centralized discovery controller 115 illustratively allows a given one of the hosts 101 to discover a list of NVM subsystems with namespaces that are accessible to the host, a subsystem to discover a list of NVMe enabled-hosts that are on the fabric, a host to discover multiple paths to an NVM subsystem, and a host to discover controllers that are statically configured.

The centralized discovery controller 115 illustratively provides all the functions of a discovery controller on the storage subsystems on the fabric, along with its own discovery log that collects data about the hosts and subsystems on the fabric. For example, the centralized discovery controller 115 can provide a single point of contact for hosts and storage subsystems to use to discover each other on the fabric. Rather than manually configuring each host to point to each subsystem, an administrator or other user can configure hosts and subsystems to point to the IP address of the centralized discovery controller 115. The centralized discovery controller 115 illustratively then acts as broker for the communication between them. In some embodiments, the centralized discovery controller 115 is implemented at least in part as a software-based entity that runs as a VM or as an embedded container on a fabric, although numerous other implementations can be used.

As will be described in more detail below, the centralized discovery controller 115 is illustratively configured to facilitate congestion mitigation in the system 100, through interaction with the MPIO drivers 114 of the hosts 101 and the storage nodes 105 of the distributed storage system 102.

Although some embodiments are described herein in the context of implementing an NVMe-oF or NVMe/TCP access protocol in a software-defined storage system or other distributed storage system, it is to be appreciated that other embodiments can be implemented in other types of storage systems using other storage access protocols.

Also, although the disclosed techniques are advantageous for certain types of host environments, such as VMware virtual machine environments in data centers or other cloud-based systems that utilize ESXi servers, the disclosed techniques are applicable to a wide variety of other host environments utilizing other types of operating systems and/or hypervisors.

As mentioned above, each of the storage nodes 105 of the distributed storage system 102 illustratively comprises one or more targets, where each such target is associated with multiple distinct paths from respective HBAs or other initiators of one or more of the hosts 101.

For example, in some embodiments, one or more of the storage nodes 105 each implements at least one target, such as an NVMe target as further described herein, that is configured to include multiple controllers, such as at least a first controller associated with a first storage pool, and a second controller associated with a second storage pool. The first and second storage pools are illustratively storage pools of the distributed storage system 102, and such storage pools may be distributed across multiple ones of the storage nodes 105. Each of the first and second storage pools is assumed to comprise one or more LUNs, NVMe namespaces or other logical storage volumes.

Although first and second controllers are referred to in conjunction with some embodiments herein, it is to be appreciated that more than two controllers can be implemented in a given target in order to support more than two storage pools.

A given one of the storage nodes 105 illustratively processes IO operations received from one or more of the hosts 101, with different ones of the IO operations being directed by the one or more hosts 101 from one or more initiators of the one or more hosts 101 to different ones of a plurality of targets implemented within the storage nodes.

The congestion mitigation in such an embodiment is illustratively implemented in the following manner.

A given one of the hosts 101, illustratively at least in part via its corresponding one of the MPIO drivers 114, interacts with centralized discovery controller 115 in implementing aspects of the congestion mitigation. For example, the MPIO driver of the given host illustratively maintains performance measurements for IO operations that it sends to the distributed storage system 102 over the network 104. These can include performance measurements based at least in part on response time and/or other performance metrics such as IO operations per second (IOPS) and throughput.

For example, the MPIO driver can monitor round-trip latency by, periodically or under other specified conditions, measuring response time of IO operations on each path between the hosts 101 and the distributed storage system 102. An increase in response time above a designated threshold relative to one or more previous measurements can indicate a potential congestion issue. Other significant changes in performance measurements over time can be used to indicate actual or potential congestion issues. Similarly, improvements in performance measurements over time, detected by the MPIO driver of the given host can indicate the resolution of a previously-detected congestion issue.

In some embodiments, the MPIO driver is configured to read storage-side performance measurements from the storage nodes 105 of the distributed storage system 102, illustratively on a per-path basis, using commands directed to those storage nodes 105. Such storage-side performance measurements are illustratively utilized by the MPIO driver to eliminate the possibility that a detected degradation based on its own host-side performance measurements may be due to a processing slowdown in one or more of the storage nodes 105. For example, if storage-side performance measurements read from a given storage node are unchanged over time but the host-side performance measurements indicate a substantial degradation in IO latency, the issue is most likely network congestion.

Accordingly, the MPIO driver in illustrative embodiments utilizes its host-side performance measurements, possibly in conjunction with storage-side performance measurements read from the storage nodes 105, to detect an actual or potential congestion issue involving at least one switch fabric of the network 104.

Responsive to such detection of a congestion issue, the MPIO driver generates a congestion alert that it sends to the centralized discovery controller 115, which is illustratively deployed on one or more of the switch fabrics of the network 104. The congestion alert is illustratively indicative of a network congestion issue in one or more switch fabrics of the network 104, although additional or alternative indications can be provided by such an alert in other embodiments, and the term "congestion alert" as used herein is therefore intended to be broadly construed so as to encompass a wide variety of different communications, notifications or other types of messages.

The centralized discovery controller 115 is configured to receive the congestion alert from the MPIO driver of the host, and responsive to the received congestion alert, to send to the host and to one or more targets of the distributed storage system 102 corresponding congestion control messages.

The one or more switch fabrics of the network 104 that implement at least portions of the centralized discovery controller 115 are considered examples of what are more generally referred to herein as "at least one processing device" comprising a processor coupled to a memory. Other types and arrangements of at least one processing device can be used to implement the centralized discovery controller 115. For example, the centralized discovery controller 115 can additionally or alternatively be deployed on at least one of the system management nodes 110 and/or on one or more servers or other components of the system 100.

In some embodiments, the centralized discovery controller 115 is further configured to identify particular targets of the distributed storage system 102 that are accessible to the host. Such target discovery functionality can be implemented at least in part in accordance with the NVMe specification documents cited elsewhere herein, although it is to be appreciated that utilization of NVMe is not a requirement in illustrative embodiments.

A given one of the congestion control messages sent by the centralized discovery controller 115 to the host or to one or more targets of the distributed storage system 102 illustratively directs the host or the one or more targets to take at least one action relating to congestion reduction in the host or the one or more targets.

For example, in some embodiments, the congestion control messages comprise respective Asynchronous Event Notifications (AENs) associated with respective Asynchronous Event Requests (AERs) previously sent by the host and the one or more targets of the distributed storage system 102 to the centralized discovery controller 115.

In some embodiments, a given one of the AENs illustratively provides a notification of a log page change to the host or the one or more targets indicating that a change has occurred to a particular log page and directing that the host or the one or more targets submit a get log page command to the centralized discovery controller 115 to obtain an updated log page. The particular log page may comprise, for example, a congestion log page and the notification of the log page change may comprise, for example, a notification of a congestion log page change. Other types of log pages and/or associated notifications can be used in other embodiments. Also, the term "congestion control message" is intended to be broadly construed, and should not be viewed as being limited to AENs.

As another example, a given one of the congestion control messages sent by the centralized discovery controller 115 to the host or to one or more targets of the distributed storage system 102 illustratively directs the host or the one or more targets to reduce a rate at which IO operations are processed by the host or the one or more targets. Such an arrangement provides congestion control messages that illustratively direct the host and/or the one or more targets of the distributed storage system 102 to temporarily "slow down" their IO processing in order to alleviate the congestion issue detected by the MPIO driver.

In some embodiments, the centralized discovery controller 115 is further configured to receive from the host a congestion cleared alert, and responsive to the received congestion cleared alert, to send to the host and to one or more targets of the distributed storage system 102 corresponding congestion cleared messages.

The congestion cleared messages illustratively comprise respective AENs associated with respective AERs previously sent by the host and the one or more targets of the storage system to the centralized discovery controller 115. For example, a given one of the AENs illustratively provides a notification of a log page change to the host or the one or more targets indicating that a change has occurred to a particular log page and directing that the host or the one or more targets submit a get log page command to the centralized discovery controller 115 to obtain an updated log page. The particular log page may comprise, for example, a congestion log page and the notification of the log page change may comprise, for example, a notification of a congestion log page change. Again, other types of log pages and/or associated notifications can be used in other embodiments. Also, the term "congestion cleared message" is intended to be broadly construed, and should not be viewed as being limited to AENs. In other embodiments, a congestion cleared message can be configured, for example, to direct the host and/or the one or more targets of the distributed storage system 102 to end the above-noted temporary "slow down" of their IO processing, in response to the congestion cleared alert received in the centralized discovery controller 115 from the MPIO driver.

The host and/or one or more storage nodes of the distributed storage system 102 in this embodiment may each also be viewed as an example of what is more generally referred to herein as "at least one processing device" comprising a processor and a memory, with the processor coupled to the memory. Other arrangements of one or more processing devices can be configured to implement at least portions of the disclosed congestion mitigation functionality in other embodiments.

As indicated previously, the host illustratively comprises a plurality of initiators and supports one or more paths between each of the initiators and one or more targets on each of the storage nodes.

It should be noted that the term "path" as used herein is intended to be broadly construed, and should not be viewed as limited to particular path types associated with particular interfaces such as NVMe or SCSI. For example, in some embodiments, a path may be associated with an initiator-target pair, also referred to in some embodiments as an initiator-target nexus or an IT nexus, and/or a particular LUN, NVMe namespace or other logical storage volume, also referred to in some embodiments as an ITL nexus. Paths in some embodiments may comprise, for example, NVMe associations. Other types and arrangements of paths may be used in other embodiments disclosed herein.

In some embodiments, the target of a given initiator-target pair providing a path from a host to a given storage node comprises an NVMe controller, although a wide variety of other types of targets can be used in other embodiments. The term "target" as used herein in the context of a distributed storage system or other type of storage system is therefore intended to be broadly construed.

The target in some embodiments more particularly comprises one or more controllers accessible via respective different associations comprising one or more TCP connections between the given host and the given storage node. For example, the target may comprise a plurality of NVMe controllers of an NVM subsystem that is at least partially resident on the given storage node.

Accordingly, in some embodiments, multiple controllers are part of a single physical controller component of the given storage node. For example, first and second controllers may comprise respective NVMe controllers of an NVM subsystem that is at least partially resident on the given storage node. Such components may be viewed as examples of what are more generally referred to herein as a "target" of the given storage node. Other types of targets comprising one or more controllers can be used in other embodiments.

The first and second controllers in some embodiments may be viewed as comprising respective "virtual" controllers associated with the single physical controller component of the given storage node.

Additionally or alternatively, the first and second controllers in some embodiments are accessible via respective first and second different associations comprising one or more TCP connections between a given one of the one or more hosts 101 and the given storage node. In such an arrangement, a host accesses the first controller using the first association, and accesses the second controller using the second association. Other types of communication links can be used in other embodiments.

In some embodiments, the first controller comprises a first set of IO queues and the second controller comprises a second set of IO queues, for use in processing IO operations for their respective storage pools. Other types of queues, such as, for example, Admin queues, can additionally or alternatively be used.

An additional example of an illustrative process for implementing at least some of the above-described congestion mitigation functionality will be provided below in conjunction with the flow diagram of FIG. 2.

As indicated previously, the storage nodes 105 collectively comprise an example of a distributed storage system. The term "distributed storage system" as used herein is intended to be broadly construed, so as to encompass, for example, scale-out storage systems, clustered storage systems or other types of storage systems distributed over multiple storage nodes.

Also, the term "storage volume" as used herein is intended to be broadly construed, and should not be viewed as being limited to any particular format or configuration.

In some embodiments, the storage nodes 105 are implemented using processing modules that are interconnected, for example, in a full mesh network or other topology providing full any-to-any network connectivity, such that a process of one of the processing modules can communicate with processes of any of the other processing modules. Commands issued by the processes can include, for example, remote procedure calls (RPCs) and/or application programming interface (API) invocations directed to other ones of the processes.

The sets of processing modules of the storage nodes 105 illustratively comprise control modules, data modules, routing modules and at least one management module. Again, these and possibly other processing modules of the storage nodes 105 are illustratively interconnected with one another in a full mesh network or other topology providing full any-to-any network connectivity, such that each of the modules can communicate with each of the other modules, although other types of networks and different module interconnection arrangements can be used in other embodiments.

The management module in such an embodiment may more particularly comprise a system-wide management module, also referred to herein as a system manager. Other embodiments can include multiple instances of the management module implemented on different ones of the storage nodes 105.

A wide variety of alternative configurations of nodes and processing modules are possible in other embodiments. Also, the term "storage node" as used herein is intended to be broadly construed, and may comprise a node that implements storage control functionality but does not necessarily incorporate storage devices. As mentioned previously, a given storage node can in some embodiments comprise a separate storage array, or a portion of a storage array that includes multiple such storage nodes.

Communication links may be established between the various processing modules of the storage nodes using well-known communication protocols such as TCP/IP and RoCEv2. For example, respective sets of IP links used in data transfer and corresponding messaging could be associated with respective different ones of the routing modules.

The particular features described above in conjunction with FIG. 1 should not be construed as limiting in any way, and a wide variety of other system arrangements implementing congestion mitigation as disclosed herein are possible.

The storage nodes 105 of the example distributed storage system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

The storage nodes 105 may be implemented on respective distinct processing platforms, although numerous other arrangements are possible. At least portions of their associated hosts 101 may be implemented on the same processing platforms as the storage nodes 105 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different subsets of the hosts 101 and the storage nodes 105 to reside in different data centers. Numerous other distributed implementations of the storage nodes 105 and their respective associated sets of hosts 101 are possible.

Additional examples of processing platforms utilized to implement storage systems and possibly their associated hosts in illustrative embodiments will be described in more detail below in conjunction with FIGS. 6 and 7.

It is to be appreciated that these and other features of illustrative embodiments are presented by way of example only, and should not be construed as limiting in any way.

Accordingly, different numbers, types and arrangements of system components such as hosts 101, distributed storage system 102, storage nodes 105, storage devices 106, storage processors 108, system management nodes 110 and MPIO drivers 114 can be used in other embodiments. For example, as mentioned previously, system management functionality of system management nodes 110 can be distributed across a subset of the storage nodes 105, instead of being implemented on separate nodes.

It should be understood that the particular sets of modules and other components implemented in a distributed storage system as illustrated in FIG. 1 are presented by way of example only. In other embodiments, only subsets of these components, or additional or alternative sets of components, may be used, and such components may exhibit alternative functionality and configurations.

For example, in other embodiments, certain portions of congestion mitigation functionality as disclosed herein can be implemented in one or more hosts, in a storage system, or partially in a host and partially in a storage system. Accordingly, illustrative embodiments are not limited to arrangements in which congestion mitigation functionality is implemented primarily in storage system or primarily in a particular host or set of hosts, and therefore such embodiments encompass various alternative arrangements, such as, for example, an arrangement in which the functionality is distributed over one or more storage systems and one or more associated hosts, each comprising one or more processing devices. The term "at least one processing device" as used herein is therefore intended to be broadly construed.

The operation of the information processing system 100 will now be described in further detail with reference to the flow diagram of the illustrative embodiment of FIG. 2, which illustrates a process for congestion mitigation as disclosed herein. This process may be viewed as an example algorithm implemented at least in part by one or more of the hosts 101 interacting with distributed storage system 102. These and other algorithms for congestion mitigation as disclosed herein can be implemented using other types and arrangements of system components in other embodiments.

Figure 2:
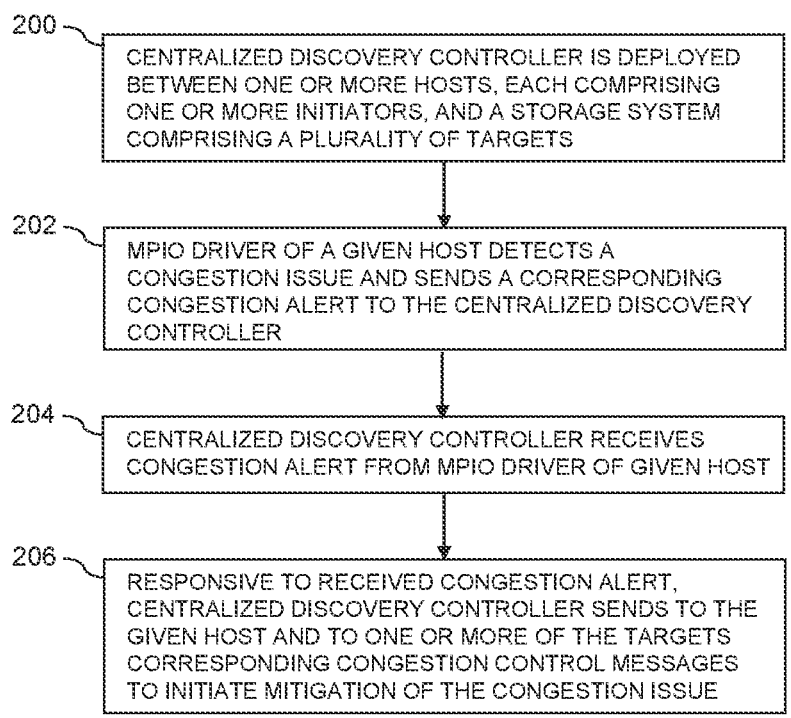
FIG. 2 is a flow diagram of a process for congestion mitigation in an illustrative embodiment.

The process illustrated in FIG. 2 includes steps 200 through 206, and is assumed to be implemented through interaction of a host, a centralized discovery controller and a storage system. The host-side portions of the process are more particularly assumed to be performed by an MPIO driver of a given host, such as one of the MPIO drivers 114 in one of the hosts 101 of the system 100, utilizing congestion mitigation logic deployed in the MPIO driver and configured to support interaction with the centralized discovery controller 115. Similar processes may be implemented primarily by interaction between other MPIO drivers of respective other hosts and the centralized discovery controller 115, and may also be implemented at least in part utilizing additional or alternative host drivers and/or other system components.

It should again be noted that the term "path" as used in this embodiment and other embodiments herein is intended to be broadly construed, and should not be viewed as limited to particular path types associated with particular interfaces such as NVMe or SCSI. For example, a given path can comprise or be otherwise associated with an IT nexus and/or an ITL nexus, or additional or alternative arrangements, and the disclosed embodiments are not limited in this regard.

In step 200, a centralized discovery controller is deployed between one or more hosts, each comprising one or more initiators, and a storage system comprising a plurality of targets. As indicated above, the centralized discovery controller may be centralized discovery controller 115 of system 100, which is configured for coupling to the hosts 101 and to the storage nodes 105 of the distributed storage system 102 via the one or more switch fabrics of the network 104. For example, the centralized discovery controller 115 may be implemented at least in part on at least a portion of a particular switch fabric over which a given one of the hosts communicates with the storage system. The centralized discovery controller is illustratively configured to identify particular targets of the storage system that are accessible to the host. Accordingly, in some embodiments, the given host communicates with the centralized discovery controller to obtain information regarding accessible targets of the storage system, rather than obtaining such information through interaction with each of the individual storage nodes. The centralized discovery controller in such embodiments therefore relieves the given host of the processing burden it would otherwise experience if it were required to conduct the target discovery on its own. Although the centralized discovery controller in some embodiments is configured in accordance with the NVMe storage access protocol, it is to be appreciated that utilization of the NVMe storage access protocol is not required in other embodiments, and the term "centralized discovery controller" as used herein is intended to be broadly construed.

In step 202, an MPIO driver of the given host detects a congestion issue and sends a corresponding congestion alert to the centralized discovery controller. For example, the congestion alert may be generated by the MPIO driver based at least in part on a congestion issue detected by the MPIO driver utilizing response time measurements and/or other performance measurements made for IO operations that the MPIO driver sends to the storage system for processing. The detection of a congestion issue by the MPIO driver can additionally or alternatively include the MPIO driver reading storage-side performance measurements from the storage system, and illustratively utilizing the storage-side performance measurements, in conjunction with its own host-side performance measurements, in the detection of a congestion issue. For example, if the storage-side performance measurements are substantially unchanged over a time period during which a spike in host-side performance measurements is detected, the issue likely involves congestion in the network over which the host communicates with the storage system.

In step 204, the centralized discovery controller receives the congestion alert from the MPIO driver of the given host. Such a congestion alert can take on any number of different formats, and the term "congestion alert" as used herein is therefore intended to be broadly construed.

In step 206, responsive to received congestion alert, the centralized discovery controller sends to the given host and to one or more of the targets of the storage system corresponding congestion control messages to initiate mitigation of the congestion issue. For example, in some embodiments, a given one of the congestion control messages sent by the centralized discovery controller to the host or to one or more targets of the storage system directs the host or the one or more targets to take at least one action relating to congestion reduction in the host or the one or more targets. As described in more detail elsewhere herein, such congestion control messages may comprise, for example, respective AENs associated with respective AERs previously sent by the host and the one or more targets of the storage system to the centralized discovery controller. In some embodiments, a given one of the AENs provides a notification of a log page change to the host or the one or more targets indicating that a change has occurred to a particular log page and directing that the host or the one or more targets submit a get log page command to the centralized discovery controller to obtain an updated log page. A wide variety of additional or alternative congestion control communications, notifications or other messages can be used in other embodiments, and the term "congestion control message" as used herein is therefore intended to be broadly construed. For example, in some embodiments, a given one of the congestion control messages sent by the centralized discovery controller to the host or to one or more targets of the storage system directs the host or the one or more targets to reduce a rate at which IO operations are processed by the host or the one or more targets. Such a congestion control message is an example of a message that directs the host or the one or more targets to temporarily "slow down" its processing of IO operations in order to alleviate the congestion issue.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are therefore presented by way of illustrative example only, and should not be construed as limiting the scope of the disclosure in any way. Alternative embodiments can use other types of processing operations for implementing congestion mitigation for one or more hosts interacting with a storage system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for respective different hosts.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

One or more hosts and/or one or more storage nodes can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Hosts, storage processors and other system components may be implemented at least in part using processing devices of such processing platforms. For example, respective path selection logic instances and other related logic instances of the hosts can be implemented in respective virtual machines running on respective ones of the processing devices of a processing platform.

Additional examples of illustrative embodiments will now be described with reference to FIGS. 3 through 5.

Figure 3:
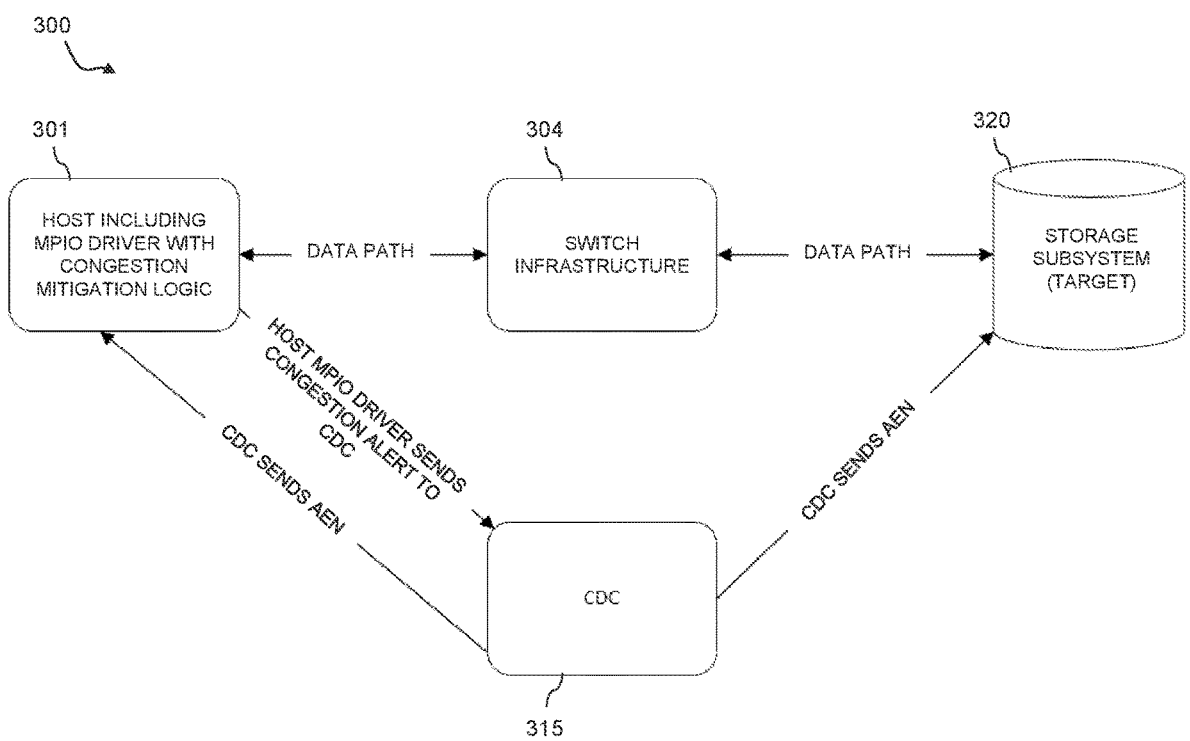
FIG. 3 shows an example distribution of different portions of multiple logical storage volumes across different storage nodes of a distributed storage system in an illustrative embodiment.

Referring initially to FIG. 3, an information processing system 300 comprises at least one host 301, switch infrastructure 304, a centralized discovery controller or CDC 315 and a storage subsystem 320. The storage subsystem 320 is assumed to be one of a plurality of storage subsystems of a storage system implemented in system 300, with each such storage subsystem being an example "target" of the storage system. The host 301 includes an MPIO driver with congestion mitigation logic, and communicates with the storage subsystem 320 via the switch infrastructure 304, utilizing data paths as illustrated. The MPIO driver in this embodiment is illustratively implemented in the form of multipathing software of the host 301. The CDC 315 communicates with the MPIO driver of the host 301 and with the storage subsystem 320, also as illustrated. In other embodiments, additional or alternative system components may be used. For example, one or more additional instances of host 301, switch infrastructure 304, CDC 315 and/or storage subsystem 320 may be included in system 300.

In this embodiment, the MPIO driver via its congestion mitigation logic is configured to periodically collect or otherwise obtain host-side performance measurements such as response time for IO operations that it sends to each of a plurality of storage subsystems, illustratively on a per-path basis. It also in some embodiments obtains corresponding storage-side performance measurements from each storage subsystem, illustratively using one or more commands in a designated storage access protocol such as NVMe or SCSI. Such storage-side performance measurements are utilized by the MPIO driver in conjunction with the obtained host-side performance measurements, to detect a congestion issue, such as congestion in at least a portion of the switch infrastructure 304. For example, if the storage-side performance measurements are substantially unchanged over a period of time for which host-side performance measurements have significantly deteriorated, it is likely that the deterioration in performance relates to network congestion in the switch infrastructure 304.

Although the CDC 315 in this embodiment is shown as being separate from the switch infrastructure 304, in other embodiments the CDC 315 can be wholly or partly implemented within the switch infrastructure 304. For example, the CDC 315 may be deployed on at least one processing device that provides at least a portion of the switch infrastructure 304.

The MPIO driver reports the detected congestion issue to the CDC 315 by sending a congestion alert to the CDC 315 as shown. The detection of congestion issues and the reporting of corresponding congestion alerts is illustratively performed by or otherwise under the control of the congestion mitigation logic. In some embodiments, the congestion alert includes detailed information about the detected congestion such as, for example, identifiers of initiators and targets of the impacted paths, the associated logical storage devices, and the latency levels or other performance measurements.

The CDC 315, in addition to providing aspects of conventional discovery controller functionality, such as that described in the NVMe specification cited elsewhere herein, further provides additional congestion mitigation functionality of the type disclosed herein. More particularly, the CDC 315 in illustrative embodiments is configured to provide a centralized management point for receiving congestion alerts from MPIO drivers of respective hosts and for distributing corresponding congestion control messages to the MPIO drivers and the storage subsystems. The CDC 315 in some embodiments may be viewed as serving as an orchestrator for congestion alerts and other congestion-related messaging, significantly reducing compatibility and complexity issues when implementing congestion mitigation in NVMe/TCP SANs and in other storage contexts.

As illustrated in the figure, the CDC 315, responsive to receipt of a congestion alert from the MPIO driver of the host 301, sends AENs to both the host 301 and the storage subsystem 320. The AENs are illustratively associated with respective AERs previously sent by the host 301 and the storage subsystem 320 to the CDC 315. The CDC 315 via its discovery controller functionality is aware of the current zoning configuration of the system 300 and can therefore determine the appropriate host and storage endpoints that are to be notified of congestion issues via respective ones of the AENs.

In some embodiments, a given one of the AENs provides a notification of a log page change to the host 301 or the storage subsystem 320 that a change has occurred to a particular log page (e.g., a congestion log page) and directs that the host 301 or the storage subsystem 320 submit a get log page command to the CDC 315 to obtain an updated log page. Additional or alternative information can be included in AENs in other embodiments.

Also, the CDC 315 can send other congestion control messages in place of or in addition to the AENs. For example, in some embodiments, the CDC 315 may be configured to send congestion control messages that direct at least one of the host 301 and the storage subsystem 320 to "slow down" by reducing a rate at which IO operations are processed by the host 301 and/or the storage subsystem 320.

These and other congestion control messages disclosed herein may directly or indirectly cause the host 301 and/or the storage subsystem to take particular congestion mitigation actions, such as reducing the rate at which IOs are sent over one or more host ports and/or reducing a rate at which IOs are serviced at one of more of the ports of the storage subsystem 320. Numerous other congestion mitigation actions may be taken in other embodiments.

Additionally or alternatively, the CDC 315 can receive from the MPIO driver of the host 301 a congestion cleared alert, and responsive to the received congestion cleared alert, can send to the host 301 and/or the storage subsystem 320 corresponding congestion cleared messages. Such congestion cleared messages, like the congestion control messages mentioned above, may comprise respective additional AENs associated with respective additional AERs previously sent by the host 301 and the storage subsystem 320 to the CDC 315. A given such additional AEN can provide a notification of a log page change to the host 301 or the storage subsystem 320, indicating that a change has occurred to a particular log page (e.g., a congestion log page) and directing that the host 301 or the storage subsystem 320 submit a get log page command to the CDC 315 to obtain an updated log page.

Figure 4:
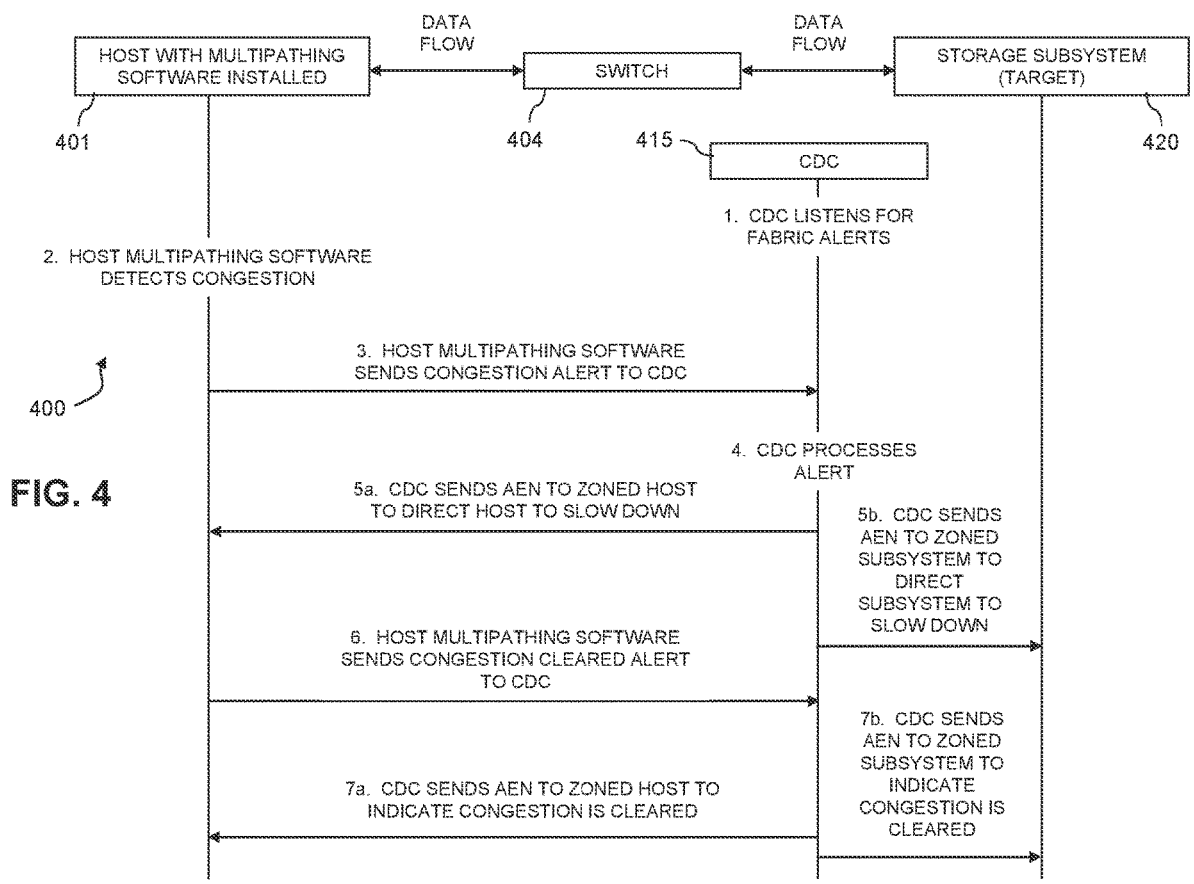
FIG. 4 is a block diagram of another information processing system incorporating functionality for congestion mitigation in an illustrative embodiment.

FIG. 4 shows another information processing system 400 with congestion mitigation functionality as disclosed herein. The system 400 comprises a host 401, a switch 404, a CDC 415 and a storage subsystem 420. Although only single instances of such components are shown in the figure, multiple instances of one or more of these components may be present, as well as additional or alternative components. It is assumed that the host 401 has multipathing software installed thereon, illustratively providing at least one MPIO driver with congestion mitigation logic as disclosed herein. The host 401 communicates with the storage subsystem 420 via the switch 404 as illustrated by the data flow shown. The host 401 is assumed to comprise one or more applications that generate IO operations that are processed by the MPIO driver for delivery to the storage subsystem 420 over selected paths through the switch 404. Although shown as separate from switch 404, the CDC 415 in some embodiments can be implemented at least in part on the switch 404, for example, using at least one processing device that is common to both the switch 404 and the CDC 415.

In some embodiments, the MPIO driver may be implemented at least in part utilizing a pluggable storage architecture (PSA). The PSA is illustratively configured to coordinate multiple multipathing plugins (MPPs), and may be viewed as an example of at least a portion of what is more generally referred to herein as a multi-path layer. Other multi-path layers, including other types of pluggable multi-path layers, can be used in other embodiments. For example, the MPIO driver may be implemented utilizing, for example, a high performance plugin (HPP) or a native multipathing plugin (NMP), although again other types and arrangements of path selection logic can be used.

As shown in FIG. 4, an example set of processing steps for congestion mitigation in the system 400 includes the following steps, although it is to be appreciated that additional or alternative steps could be used in a given embodiment:

1. The CDC listens for fabric alerts and notifications (e.g., FPINs).
2. The host multipathing software detects congestion (e.g., increased latency).
3. The host multipathing software sends to the CDC an alert with the following example information:
    (a) Host initiator and storage controller target information;
    (b) Logical storage volume and latency rate of the offending traffic flow; and
    (c) Timestamps identifying when the issue occurred and how long it has been ongoing.
4. The CDC receives the alert from the multipathing software, logs it, and parses the information.
5. Depending on the information contained in the alert, the CDC will take the following actions for each of one or more hosts and one or more targets:
    (a) If the congestion is identified as being host-side related (e.g., congestion originating from the host initiator side of the fabric), the CDC will send an AEN to an initiator endpoint of the host with a message that it needs to slow down the traffic to help clear the congestion; and
    (b) If the congestion is identified as storage-side related (e.g., congestion originating from the target storage endpoint as when the storage becomes slower), the CDC will send an AEN to the appropriate storage endpoint (e.g., storage subsystem port) to direct it to throttle down the IO bandwidth. The amount of throttling down can be to the host-negotiated speed, which is assumed to be known to the storage endpoint. If the storage endpoint bandwidth is already at the initiator bandwidth, it can be throttled down to a lower value given by a percentage X of the current speed, where X is less than 100% and in some embodiments may be on the order of 50%. If the previously-detected congestion disappears (e.g., no more AENs indicative of congestion arrive) after a designated period of time given by Y seconds, the storage endpoint will increase its bandwidth again, and if necessary will lower it again if AENs indicative of congestion resume.

In some embodiments, the CDC sends both of the above-noted AENs referred to in (a) and (b) of this step, to the host and the storage subsystem, respectively. In such an arrangement, the CDC need not determine whether the detected congestion is host-side related or storage-side related.

6. When the congestion is cleared, the multipathing software on the host will send out an "all clear" alert to the CDC. Such an alert may be broadcast to the switch fabric, or sent using other techniques.
7. The CDC, responsive to receipt of such an "all clear" alert, illustratively sends out AENs to at least one of:
    (a) the host involved in the original congestion, directing it to remove any IO throttles previously put in place; and
    (b) the storage subsystem involved in the original congestion, directing it to remove any IO throttles previously put in place.

Again, in some embodiments, the CDC sends both of the above-noted AENs referred to in (a) and (b) of this step, to the host and the storage subsystem, respectively.

These processing steps collectively represent an example algorithm implemented by at least one processing device. Again, additional or alternative processing steps can be used in other embodiments.

As indicated previously, the AENs sent from the CDC to the host and storage endpoints illustratively comprise completions of respective outstanding AERs that were previously sent by those endpoints to the CDC. The purpose of such AERs is to request that the CDC notify the endpoints of particular changes or other events of interest to the endpoints, which in illustrative embodiments include changes in congestion status. When the CDC receives such an AER from an endpoint, it can keep this AER open and active for an extended period of time, which could be on the order of days or weeks. When the CDC detects an event that the endpoint is interested in, it will complete the outstanding AER by sending an AEN comprising a Completion Queue Entry (CQE) to the endpoint. The CQE illustratively contains information about the particular event that was detected, which in some embodiments is a change in congestion status based at least in part on one or more alerts received from one or more MPIO drivers of one or more hosts.

In response to receiving the AEN comprising the CQE, the endpoint will typically transmit another AER command to the CDC. This allows the endpoint to get additional AENs about different events that may happen in the future. The endpoint will also illustratively send a Get Log Page command to the CDC to retrieve detailed event information. Such a Get Log Page command is utilized to obtain the detailed event information as there is only very limited space available in the CQE.

In some embodiments, the Asynchronous Event Type for the AER is illustratively set to "010b Notice." Also, in order to communicate congestion information from the CDC to the host or storage endpoints, a new Event Type "Value" is defined, illustratively "F1h" and having the following "Description" associated with it:

Congestion Log Page Change: A change has occurred to one or more of the Congestion Log Pages. The host should submit a Get Log Page command to receive updated Congestion Log Pages.

The Congestion Log Page in some embodiments is similar to a Discovery Log Page but contains Congestion Log Page entries that are associated with one or more endpoints involved in the detected congestion event. This new Congestion Log Page is assumed to have an assigned Log Page Identifier, illustratively "71h."

As indicated previously, congestion alerts sent to the CDC from an endpoint can take on any of a variety of different forms. For example, such an alert can comprise a REST API call (e.g., POST) containing information about the detected congestion and the endpoint that detected the congestion. This information can include any or all of the information normally associated with a Discovery Log page Entry Data Structure.

These and other aspects of AERs and/or AENs and associated congestion alerts congestion log pages are examples only, and can be varied in other embodiments.

Figure 5:
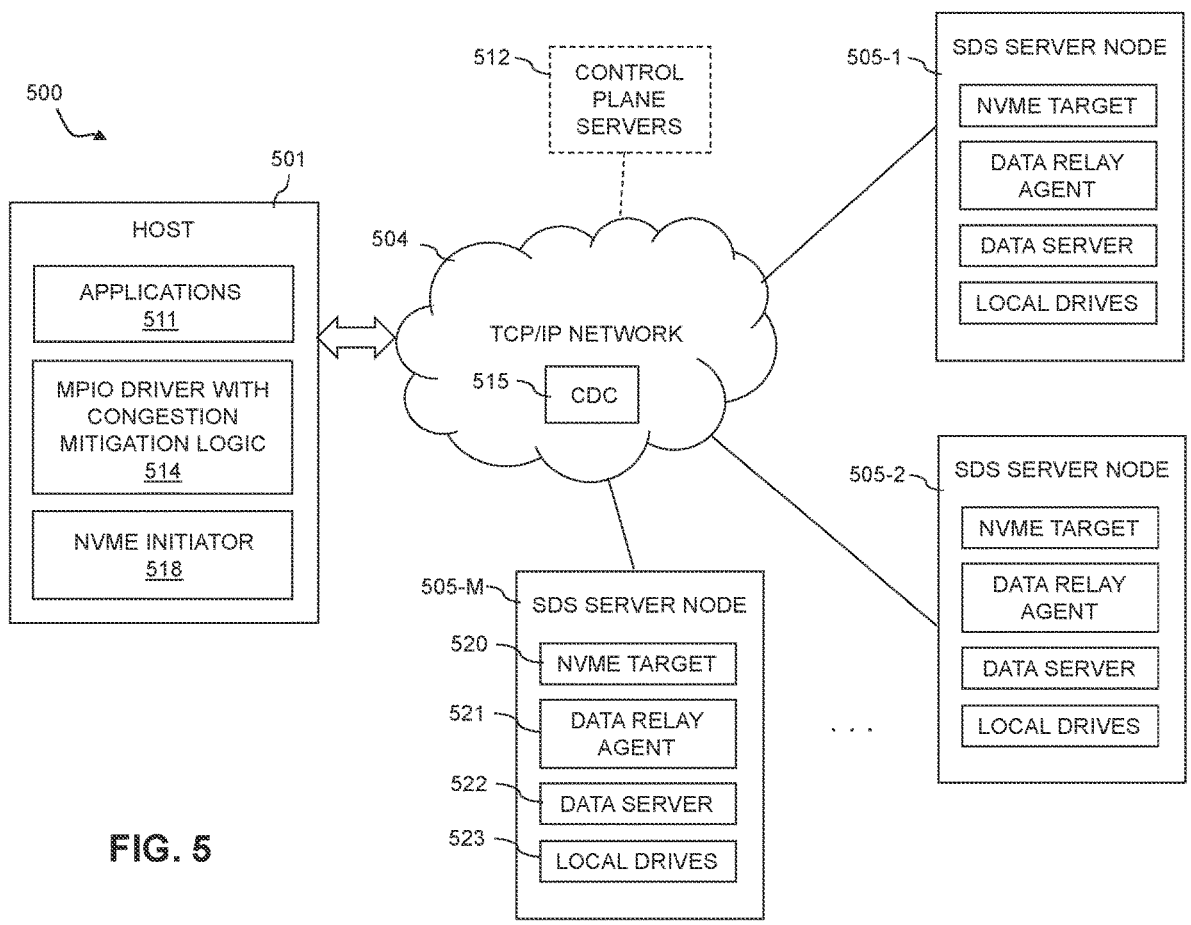
FIG. 5 shows an example of an information processing system comprising a software-defined storage system and incorporating functionality for congestion mitigation in an illustrative embodiment.

FIG. 5 illustrates an example of a distributed storage system that more particularly comprises a software-defined storage system having a plurality of software-defined storage server nodes, also referred to as SDS server nodes, configured to utilize an NVMe storage access protocol such as NVMe-oF or NVMe/TCP. Such SDS server nodes are examples of "storage nodes" as that term is broadly used herein. As will be appreciated by those skilled in the art, similar embodiments can be implemented without the use of software-defined storage and with other storage access protocols.

As shown in FIG. 5, an information processing system 500 comprises a host 501 configured to communicate over a network 504, illustratively a TCP/IP network, with a software-defined storage system comprising a plurality of SDS server nodes 505-1, 505-2, . . . 505-M and corresponding control plane servers 512. The control plane servers 512 are shown in dashed outline as the functionality of such servers in illustrative embodiments is distributed over a particular subset of the SDS server nodes 505 rather than being implemented on separate nodes of the software-defined storage system. The control plane servers 512 provide system management functionality such as centralized storage provisioning, monitoring, membership management, as well as storage partitioning. The system 500 further includes a CDC 515 that is able to communicate with the host 501 and each of the SDS server nodes 505.

A plurality of applications 511 execute on the host 501 and generate IO operations that are delivered to particular ones of the SDS server nodes 505 via at least one NVMe initiator 518. The host 501 further comprises an MPIO driver 514 that includes congestion mitigation logic illustratively configured to carry out aspects of congestion mitigation functionality of the host 501 in a manner similar to that previously described. For example, the congestion mitigation logic is illustratively implemented as a component of the MPIO driver 514, configured to obtain performance measurements, to detect congestion issues based on the performance measurements, and to send corresponding alerts to the CDC 515 that is illustratively implanted in the TCP/IP network 504. In other embodiments, the congestion mitigation logic may be a separate component of the host 501, rather than part of the MPIO driver 514 as illustrated in the embodiment shown in the figure. Also, although only a single host 501 is shown by way of illustrative example in system 500, the system 500 can include multiple hosts, each configured as generally shown for host 501, as in the system 100 of FIG. 1. One or more additional instances of the CDC 515 may also be included, in some embodiments.

Each of the SDS server nodes 505 in the present embodiment comprises at least one NVMe target 520, a data relay agent 521, a data server 522 and a set of local drives 523. The internal components of a given SDS server node with the exception of the local drives 523 are illustratively part of a corresponding storage processor in the FIG. 1 embodiment, although numerous other arrangements are possible.

It should also be noted that the local drives 523, although illustratively shown by way of example only as being part of their respective corresponding SDS server nodes 505, can instead be implemented in whole or in part externally to the SDS server nodes 505. Such SDS server nodes, and other storage nodes referred to herein, need not physically contain local drives, but can instead be coupled to or otherwise associated with such local drives.

The data relay agent 521 facilitates relaying of IO requests between different ones of the SDS server nodes 505, and the data servers 522 provide access to data stored in the local drives 523 of their respective SDS server nodes 505. Additional or alternative components may be included in the SDS server nodes 505 in illustrative embodiments.

Although single NVMe initiators and targets are shown in respective ones of the host 501 and the SDS server nodes 505, this is by way of simplified illustration only, and other embodiments can include multiple NVMe initiators within host 501 and multiple NVMe targets within each of the SDS server nodes 505.

In some embodiments, the SDS server nodes 505 are configured at least in part as respective PowerFlex® software-defined storage nodes from Dell Technologies, although other types of storage nodes can be used in other embodiments. These and other storage nodes can be modified in some embodiments to implement aspects of the disclosed functionality.

The NVMe targets 520 in some embodiments collectively comprise an NVM subsystem that implements multiple distinct controllers. For example, a given such NVMe target can comprise at least a first controller associated with a first storage pool of the distributed storage system, and a second controller associated with a second storage pool of the distributed storage system. Other types and arrangements of single or multiple controllers can be used, and the term "controller" as used herein is intended to be broadly construed, and should not be viewed as being limited to any particular interface type, such as NVMe or SCSI.

Also, the term "NVMe target" as used herein is intended to be broadly construed, to encompass, for example, any component that is a target of an NVMe command. Moreover, as indicated previously, terms such as "target" and "path" as used herein should not be viewed as being limited to any particular interface type, such as NVMe or SCSI.

A given one of the SDS server nodes 505 processes IO operations received from the host 501, with different ones of the IO operations being directed by the host 501 from NVMe initiator 518 to different ones of the first and second controllers of the NVMe target 520 of the given SDS server node.

In some embodiments, the host 501 communicates with the SDS server nodes 505 via a plurality of TCP associations including at least a first TCP association and a second TCP association, although other communication arrangements can be used. A given such "TCP association" as that term is broadly used herein illustratively comprises one or more TCP connections of an association between a host and a controller. For example, an association between a host and a controller may comprise multiple TCP connections, one for an Admin Queue and one for each of a plurality of IO queues.

The NVMe targets 520 in some embodiments comprise respective NVM subsystems. The NVM subsystem is an example of what is more generally referred to herein as a "target" of the storage system, and each of the SDS server nodes 505 can include multiple such targets, each illustratively implemented as a separate NVM subsystem.

The NVM subsystem in some embodiments comprises at least a first controller and a second controller, with the first and second controllers being associated with respective distinct storage pools of the storage system. In other embodiments, the NVM subsystem can comprise more than two controllers, each associated with one or more storage pools. Accordingly, other embodiments can include only a single storage pool, or can involve different associations between multiple controllers and multiple storage pools. The NVM subsystem in the present embodiment is illustratively a single physical controller component of the storage system, and the first and second controllers may be viewed as comprising respective virtual controllers associated with that single physical controller component, although numerous other arrangements are possible in other embodiments.

The storage system processes IO operations received from the host 501 via the TCP associations. For example, the host 501 illustratively directs IO operations from the NVMe initiator 518 to the first controller via the first TCP association, and directs IO operations from the NVMe initiator to the second controller via the second TCP association. The first and second controllers may comprise respective first and second sets of IO queues. Also the above-noted TCP associations are in the context of NVMe/TCP, the disclosed techniques are more broadly applicable to other contexts, including by way of example other NVMe-OF transport contexts, such as FC and RDMA.

The capacities of the first and second sets of IO queues of the respective first and second controllers may be made different from one another by configuring those first and second sets of IO queues to have at least one of a different number of IO queues and a different IO queue size relative to one another, although in other embodiments the first and second sets of IO queues may have the same capacity.

In some embodiments, the NVMe targets 520, each illustratively comprising one or more NVM subsystems, may be configured as a software-defined target or SDT of the software-defined storage system. Such a target can be implemented at least in part as a Linux user space component, illustratively comprising a daemon listening for incoming TCP connections from one or more NVMe initiators 518 of the host 501. The NVMe target comprising a given NVM subsystem is illustratively accessible from the host 501 via one or more TCP associations, each of which may be associated with a different one of the above-noted first and second controllers of the NVM subsystem.

Congestion alerts generated by or under the control of the congestion mitigation logic of the MPIO driver 514 are illustratively sent to the CDC 515 and processed in a manner similar to that described elsewhere herein, to generate AENs or other congestion control messages that are sent to the host 501 and one or more of the SDS server nodes 505.

These and other features of illustrative embodiments are presented by way of example only, and can be varied in other embodiments. For example, the disclosed congestion mitigation techniques can be implemented using additional or alternative components of one or more hosts, at least one centralized discovery controller, and a distributed storage system or other type of storage system.

The above-described illustrative embodiments can provide significant advantages over conventional approaches.

For example, illustrative embodiments disclosed herein provide techniques for congestion mitigation that facilitate the usage of advanced storage access protocols such as NVMe-oF or NVMe/TCP while avoiding the above-described drawbacks of conventional practice. For example, some embodiments can substantially eliminate or otherwise alleviate one or more of the compatibility and complexity drawbacks of ECN mechanisms, thereby providing significantly enhanced congestion mitigation.

Some embodiments leverage a centralized discovery controller to provide centralized congestion mitigation, illustratively by configuring the centralized discovery controller to act upon congestion alerts sent from host multipathing software.

These and other embodiments provide significant benefits to administrators and other system users. For example, administrators will not have to configure network congestion monitoring and mitigation measures on all the components of the data path. These benefits are provided in some embodiments through modification of existing components, such as MPIO drivers and centralized discovery controllers, in the manner disclosed herein. As indicated previously, the difficulties associated with conventional ECN mechanisms can be completely avoided in some embodiments.

Illustrative embodiments disclosed herein can operate with any storage protocol such as those based on NVMe and/or SCSI on any host operating system and with any storage system configuration.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement hosts and distributed storage systems with congestion mitigation functionality will now be described in greater detail with reference to FIGS. 6 and 7. Although described in the context of system 100, these platforms may also be used to implement at least portions of other information processing systems in other embodiments.

Figure 6:
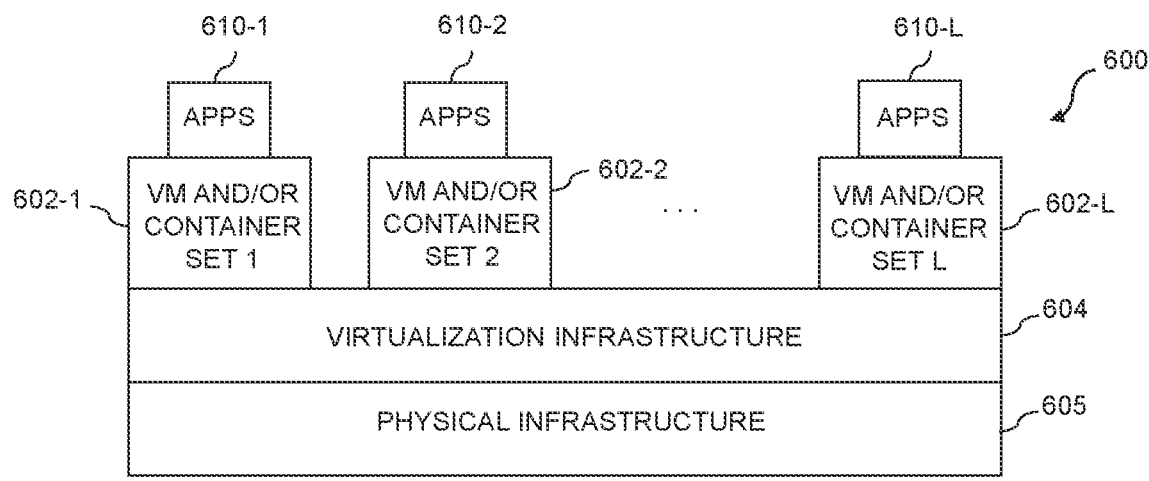
FIGS. 6 and 7 show examples of processing platforms that may be utilized to implement at least a portion of an information processing system in illustrative embodiments.
Figure 7:
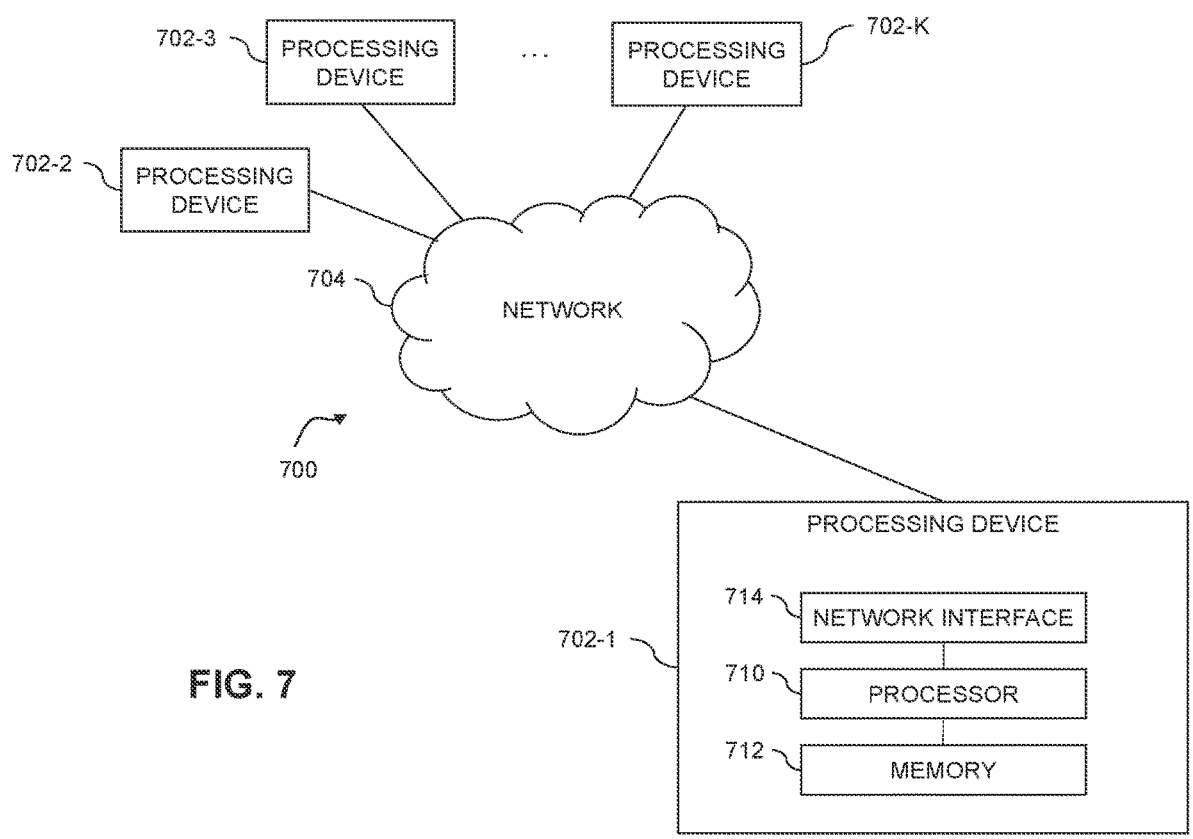

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide congestion mitigation functionality in a distributed storage system of the type described above using one or more processes running on a given one of the VMs. For example, each of the VMs can implement logic instances and/or other components for implementing functionality associated with congestion mitigation in the system 100.

A hypervisor platform may be used to implement a hypervisor within the virtualization infrastructure 604. Such a hypervisor platform may comprise an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can also provide congestion mitigation functionality in a distributed storage system of the type described above. For example, a container host supporting multiple containers of one or more container sets can implement logic instances and/or other components for implementing functionality associated with congestion mitigation in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the congestion mitigation functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, hosts, storage systems, storage nodes, storage devices, storage processors, initiators, targets, MPIO drivers, multi-path layers, congestion mitigation logic, path selection logic, switch fabrics, switch infrastructure, centralized discovery controllers and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to implement a centralized discovery controller for coupling to a host and to a storage system accessed by the host;
wherein the centralized discovery controller is configured:
to receive from the host a congestion alert; and
responsive to the received congestion alert, to send to at least one of the host and one or more targets of the storage system one or more corresponding congestion control messages;
wherein the one or more congestion control messages comprise one or more Asynchronous Event Notifications (AENs) associated with one or more respective Asynchronous Event Requests (AERs) previously sent by at least one of the host and the one or more targets of the storage system to the centralized discovery controller.

2. The apparatus of claim 1 wherein the at least one processing device comprises at least a portion of a switch fabric over which the host communicates with the storage system.

3. The apparatus of claim 1 wherein the centralized discovery controller is further configured to identify particular targets of the storage system that are accessible to the host.

4. The apparatus of claim 1 wherein the congestion alert is received in the centralized discovery controller from a multi-path input-output driver of the host and wherein the multi-path input-output driver controls delivery of input-output operations from the host to the storage system over selected paths.

5. The apparatus of claim 4 wherein the congestion alert is generated by the multi-path input-output driver based at least in part on a congestion issue detected by the multi-path input-output driver.

6. The apparatus of claim 1 wherein a given one of the congestion control messages sent by the centralized discovery controller to the host or to one or more targets of the storage system directs the host or the one or more targets to take at least one action relating to congestion reduction in the host or the one or more targets.

7. The apparatus of claim 1 wherein a given one of the AENs provides a notification of a log page change to the host or the one or more targets indicating that a change has occurred to a particular log page and directing that the host or the one or more targets submit a get log page command to the centralized discovery controller to obtain an updated log page.

8. The apparatus of claim 7 wherein the particular log page comprises a congestion log page and the notification of the log page change comprises a notification of a congestion log page change.

9. The apparatus of claim 1 wherein the centralized discovery controller is further configured:
to receive from the host a congestion cleared alert; and
responsive to the received congestion cleared alert, to send to at least one of the host and one or more targets of the storage system one or more corresponding congestion cleared messages.

10. The apparatus of claim 9 wherein the congestion cleared messages comprise one or more additional AENs associated with one or more respective AERs previously sent by at least one of the host and the one or more targets of the storage system to the centralized discovery controller.

11. The apparatus of claim 10 wherein a given one of the additional AENs provides a notification of a log page change to the host or the one or more targets indicating that a change has occurred to a particular log page and directing that the host or the one or more targets submit a get log page command to the centralized discovery controller to obtain an updated log page.

12. The apparatus of claim 11 wherein the particular log page comprises a congestion log page and the notification of the log page change comprises a notification of a congestion log page change.

13. The apparatus of claim 1 wherein a given one of the congestion control messages sent by the centralized discovery controller to the host or to one or more targets of the storage system directs the host or the one or more targets to reduce a rate at which input-output operations are processed by the host or the one or more targets.

14. A computer program product comprising a non-transitory processor-readable storage medium having stored therein program code of one or more software programs, wherein the program code when executed by at least one processing device comprising a processor coupled to a memory, causes the at least one processing device:
to implement a centralized discovery controller for coupling to a host and to a storage system accessed by the host;
wherein the centralized discovery controller is configured:
to receive from the host a congestion alert; and
responsive to the received congestion alert, to send to at least one of the host and one or more targets of the storage system one or more corresponding congestion control messages;
wherein the one or more congestion control messages comprise one or more Asynchronous Event Notifications (AENs) associated with one or more respective Asynchronous Event Requests (AERs) previously sent by at least one of the host and the one or more targets of the storage system to the centralized discovery controller.

15. The computer program product of claim 14 wherein the congestion alert is received in the centralized discovery controller from a multi-path input-output driver of the host and wherein the multi-path input-output driver controls delivery of input-output operations from the host to the storage system over selected paths.

16. A method comprising:
implementing a centralized discovery controller between a host and a storage system accessed by the host;
receiving in the centralized discovery controller from the host a congestion alert; and
responsive to the received congestion alert, sending from the centralized discovery controller to at least one of the host and one or more targets of the storage system one or more corresponding congestion control messages;
wherein the one or more congestion control messages comprise one or more Asynchronous Event Notifications (AENs) associated with one or more respective Asynchronous Event Requests (AERs) previously sent by at least one of the host and the one or more targets of the storage system to the centralized discovery controller; and
wherein the method is performed by at least one processing device comprising a processor coupled to a memory.

17. The method of claim 16 wherein the congestion alert is received in the centralized discovery controller from a multi-path input-output driver of the host and wherein the multi-path input-output driver controls delivery of input-output operations from the host to the storage system over selected paths.

18. The method of claim 16 wherein a given one of the AENs provides a notification of a log page change to the host or the one or more targets indicating that a change has occurred to a particular log page and directing that the host or the one or more targets submit a get log page command to the centralized discovery controller to obtain an updated log page.

19. The method of claim 18 wherein the particular log page comprises a congestion log page and the notification of the log page change comprises a notification of a congestion log page change.

20. The method of claim 16 wherein the centralized discovery controller is further configured:
to receive from the host a congestion cleared alert; and responsive to the received congestion cleared alert, to send to at least one of the host and one or more targets of the storage system corresponding congestion cleared messages.

\* \* \* \* \*